(12) United States Patent
Li et al.

(10) Patent No.: US 11,449,123 B2
(45) Date of Patent: Sep. 20, 2022

(54) PROMPT INFORMATION DISPLAY METHOD AND ELECTRONIC DEVICE

(71) Applicant: Huawei Technologies Co., Ltd., Shenzhen (CN)

(72) Inventors: Wei Li, Wuhan (CN); Shoucheng Wang, Shanghai (CN); Binke Yu, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 66 days.

(21) Appl. No.: 17/041,289

(22) PCT Filed: Mar. 26, 2018

(86) PCT No.: PCT/CN2018/080578
§ 371 (c)(1),
(2) Date: Sep. 24, 2020

(87) PCT Pub. No.: WO2019/183786
PCT Pub. Date: Oct. 3, 2019

(65) Prior Publication Data
US 2021/0116986 A1    Apr. 22, 2021

(51) Int. Cl.
G06F 1/3231    (2019.01)
G06F 1/16      (2006.01)
G06F 1/3234    (2019.01)
G06F 1/3287    (2019.01)
G06F 9/54      (2006.01)
G06V 40/13     (2022.01)

(52) U.S. Cl.
CPC .......... *G06F 1/3231* (2013.01); *G06F 1/1643* (2013.01); *G06F 1/3265* (2013.01); *G06F 1/3287* (2013.01); *G06F 9/542* (2013.01); *G06V 40/13* (2022.01)

(58) Field of Classification Search
CPC .... G06F 1/3231; G06F 1/1643; G06F 1/3265; G06F 1/3287; G06F 9/542; G06V 40/13
See application file for complete search history.

(56) References Cited

U.S. PATENT DOCUMENTS

| | | | |
|---|---|---|---|
| 10,123,275 B2 | 11/2018 | Chang et al. | |
| 11,269,073 B2 * | 3/2022 | Li | G06F 3/0421 |
| 2016/0109934 A1 | 4/2016 | Woo et al. | |

(Continued)

FOREIGN PATENT DOCUMENTS

| CN | 105228116 A | 1/2016 |
|---|---|---|
| CN | 105426141 A | 3/2016 |

(Continued)

*Primary Examiner* — Santosh R Poudel
(74) *Attorney, Agent, or Firm* — Slater Matsil, LLP

(57) ABSTRACT

A prompt information display method and an electronic device, the method including displaying, by the electronic device, prompt information on the screen when the electronic device is in a screen-off state, where the prompt information includes a fingerprint identifier, and the fingerprint identifier is used to indicate a fingerprint recognition area, after the electronic device displays the prompt information on the screen, stopping, by the electronic device, displaying the prompt information on the screen if a first preset condition is met, and displaying, by the electronic device, the prompt information on the screen if a second preset condition is met.

18 Claims, 19 Drawing Sheets

(56) References Cited

U.S. PATENT DOCUMENTS

| | | | |
|---|---|---|---|
| 2017/0308215 A1 | 10/2017 | Cho et al. | |
| 2017/0308226 A1* | 10/2017 | Yoo | G06F 3/0488 |
| 2018/0024708 A1* | 1/2018 | Kim | G06F 3/03545 |
| | | | 715/268 |
| 2018/0033360 A1* | 2/2018 | Bae | G09G 3/2096 |
| 2018/0061309 A1* | 3/2018 | Bae | G09G 5/006 |
| 2018/0074627 A1 | 3/2018 | Kong et al. | |
| 2018/0075273 A1* | 3/2018 | Vissa | G06F 3/04842 |
| 2018/0176746 A1* | 6/2018 | Kapatralla | H04W 52/027 |
| 2018/0277065 A1 | 9/2018 | Zuo et al. | |
| 2018/0314536 A1* | 11/2018 | Wang | G06Q 20/386 |
| 2019/0019048 A1* | 1/2019 | Deng | H04L 9/3231 |

FOREIGN PATENT DOCUMENTS

| | | | | |
|---|---|---|---|---|
| CN | 106200878 A | | 12/2016 | |
| CN | 107111763 A | | 8/2017 | |
| CN | 107908334 A | * | 4/2018 | ........... G06F 1/3265 |
| CN | 108255369 A | * | 7/2018 | ......... G06F 3/04817 |
| EP | 2713586 A2 | | 4/2014 | |

\* cited by examiner (a)  (b)

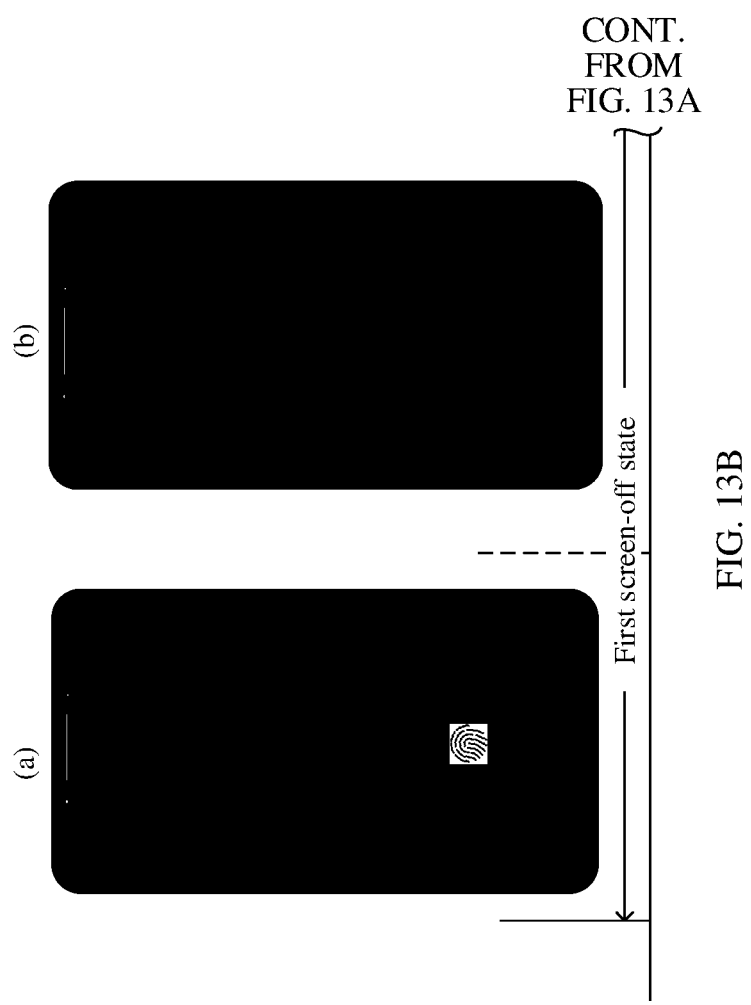

PROMPT INFORMATION DISPLAY METHOD AND ELECTRONIC DEVICE

CROSS REFERENCE TO RELATED APPLICATIONS

This application is a national stage of International Application No. PCT/CN2018/080578, filed on Mar. 26, 2018, which is hereby incorporated by reference in its entirety.

TECHNICAL FIELD

This application relates to the field of electronic technologies, and in particular, to a prompt information display method and an electronic device.

BACKGROUND

Currently, a bezel-less screen has become a mainstream design solution used for an electronic device such as a mobile phone. A position of a fingerprint module originally disposed at the bottom of a screen needs to be adjusted. In a solution, the fingerprint module is disposed within the screen or behind the screen, and is currently also referred to as an under display (under display, UD) fingerprint.

When the fingerprint module is disposed within the screen or behind the screen, because of integrity of the screen, a protrusion or dented hole at which a user clearly perceives a fingerprint position does not exist in a fingerprint recognition area, on the screen, corresponding to the fingerprint module. In the prior art, a fingerprint icon is usually displayed in an area, on the screen, corresponding to the fingerprint module, to indicate a position of the fingerprint recognition area, and the fingerprint icon is displayed by using an always on display (always on display, AOD) technology after the user turns off the screen.

In a solution in which the fingerprint icon is displayed by using an AOD, in a screen-off state, an application processor (application processor, AP) of the electronic device is in a wake-up state, and the electronic device in the wake-up state enters an always on display state. As shown in FIG. 1, the electronic device always displays the fingerprint icon on the screen, so that the user can perform fingerprint unlocking in the screen-off state at any time by using the fingerprint icon. However, always displaying the fingerprint icon in the always on display state causes relatively high power consumption of the electronic device.

SUMMARY

Embodiments of this application provide a prompt information display method and an electronic device, so that a fingerprint identifier can be intermittently displayed in a screen-off state, thereby reducing power consumption of the electronic device.

To achieve the foregoing objective, the following technical solutions are used in the embodiments of this application.

According to an aspect, an embodiment of this application provides a prompt information display method, applied to an electronic device having a touchscreen, including: displaying, by the electronic device, prompt information on the screen when the electronic device is in a screen-off state, where the prompt information includes a fingerprint identifier, and the fingerprint identifier is used to indicate a fingerprint recognition area; and after the electronic device displays the prompt information on the screen, stopping, by the electronic devices, displaying the prompt information on the screen if a first preset condition is met. In this solution, in the screen-off state, the electronic device may intermittently and dynamically display the prompt information such as the fingerprint identifier on the screen based on an actual requirement, to reduce power consumption of the electronic device.

In a possible design, after the stopping, by the electronic device, displaying the prompt information on the screen, the method further includes: displaying, by the electronic device, the prompt information on the screen if a second preset condition is met.

In another possible design, the stopping, by the electronic devices, displaying the prompt information on the screen if a first preset condition is met specifically includes: if it is detected that duration during which the prompt information is displayed is greater than or equal to preset duration, stopping, by the electronic device, displaying the prompt information on the screen; or if it is detected that light is blocked, stopping, by the electronic device, displaying the prompt information on the screen; or if it is detected, in a handheld motion state, that a side of the electronic device faces upward, stopping, by the electronic device, displaying the prompt information on the screen.

In another possible design, the displaying, by the electronic device, the prompt information on the screen if a second preset condition is met specifically includes: if the electronic device is lifted, displaying, by the electronic device, the prompt information on the screen; or if it is detected that the screen is touched, displaying, by the electronic device, the prompt information on the screen; or if a floating event is detected in the fingerprint recognition area or a preset area, displaying, by the electronic device, the prompt information on the screen; or if it is detected, in the handheld motion state, that a front side of the electronic device faces upward, displaying, by the electronic device, the prompt information on the screen; or if it is detected, in the handheld motion state, that the side of the electronic device faces upward and a pressure value in the fingerprint recognition area or a preset area is greater than or equal to a preset value, displaying, by the electronic device, the prompt information on the screen.

In another possible design, the electronic device includes a first processor and a second processor, and when the electronic device is in a screen-on state or a screen-obscurity state, if the first processor detects a screen-off event, the electronic device enters the screen-off state; the displaying, by the electronic device, prompt information on the screen when the electronic device is in a screen-off state includes: when the electronic device is in the screen-off state, instructing, by the second processor, the screen to display the prompt information; and the stopping, by the electronic device, displaying the prompt information on the screen includes: instructing, by the second processor, the screen to stop displaying the prompt information. In this solution, the electronic device can intermittently and dynamically display the fingerprint identifier by using a low-power consumption coprocessor, to significantly save power of the electronic device. When the electronic device is in the screen-off state, the first processor is in a sleep state.

In another possible design, the second processor is configured to manage at least one sensor and/or the screen, and the instructing, by the second processor, the screen to display the prompt information or stop displaying the prompt information specifically includes: instructing, by the second processor based on detection data of the at least one sensor and/or an interrupt event of the screen, the screen to display the prompt information or stop displaying the prompt information.

In another possible design, after the first processor detects the screen-off event, the method further includes: sending, by the first processor, an instruction command to the second processor, where the instruction command includes a start command, and the start command is used to instruct to enable an always on display function; entering, by the first processor, a sleep state; after receiving the start command, triggering, by the second processor, a display subsystem (display subsystem, DSS) to be powered on; obtaining, by the DSS, to-be-displayed content of the prompt information according to a display rule; transmitting, by the DSS, the to-be-displayed content to the screen; and entering, by the DSS, a power-off state; and the instructing, by the second processor, the screen to display the prompt information specifically includes: instructing, by the second processor, the screen to display the prompt information based on the to-be-displayed content.

In another possible design, the electronic device includes a shared memory, and the shared memory is configured to store the to-be-displayed content of the prompt information; if the start command is a start command sent by the first processor for the first time, the instruction command further includes a display rule command, and the display rule command is used to indicate a display rule; and the obtaining, by the DSS, to-be-displayed content according to a display rule specifically includes: obtaining, by the DSS, the to-be-displayed content from the shared memory according to the display rule indicated by the display rule command.

In another possible design, the display rule command includes a display area setting command, and the display area setting command is used to indicate a position of a to-be-displayed area; the shared memory stores to-be-displayed content of a plurality of fingerprint identifiers; and the instructing, by the second processor, the screen to display the prompt information specifically includes: sending, by the second processor, a display instruction to the screen; and displaying, by the screen, one of the plurality of fingerprint identifiers after receiving the display instruction.

In another possible design, after the entering, by the first processor, a sleep state, the method further includes: when the first processor is woken up by a screen-on event, sending, by the first processor, another instruction command to the second processor, where the another instruction command is a stop command, and the stop command is used to instruct to disable the always on display function.

In another possible design, the prompt information further includes at least one of time information, date information, power information, an SMS message prompt, a missed call prompt, or the like.

In another possible design, the prompt information further includes time information and date information, and when the start command is a start command sent by the first processor for the first time, the instruction command further includes a command for setting time and time zone formats, and the command for setting time and time zone formats is used to indicate time and time zone formats.

In another possible design, the prompt information further includes other information, and after the entering, by the first processor, a sleep state, the method further includes: entering, by the first processor, a wake-up state when the other information needs to be updated; sending, by the first processor, a start update command to the second processor; writing, by the first processor, to-be-displayed content of updated other information into the shared memory; sending, by the first processor, an end update command to the second processor; instructing, by the second processor, the DSS to be powered on; obtaining, by the DSS, the to-be-displayed content of the updated other information; transmitting, by the DSS, the to-be-displayed content of the updated other information to the screen; entering, by the DSS, the power-off state; and displaying, by the screen, the updated other information.

In another possible design, the first processor is an application processor, and the second processor is a coprocessor.

According to another aspect, an embodiment of this application further provides a prompt information display method, applied to an electronic device having a touchscreen, and the electronic device further includes a first processor and a second processor. The method includes: when the electronic device is in a screen-on state or a screen-obscurity state, if the first processor detects a screen-off event, entering, by the electronic device, a screen-off state; when the electronic device is in the screen-off state, instructing, by the second processor, the screen to display prompt information, where the prompt information includes a fingerprint identifier, and the fingerprint identifier is used to indicate a fingerprint recognition area; and after the second processor instructs the screen to display the prompt information, instructing, by the second processor if a first preset condition is met, the screen to stop displaying the prompt information. In this solution, in the screen-off state, the electronic device can intermittently and dynamically display the fingerprint identifier by using a low-power consumption coprocessor, to significantly save power of the electronic device.

In a possible design, after the instructing, by the second processor, the screen to stop displaying the prompt information, the method further includes: instructing, by the second processor if a second preset condition is met, the screen to display the prompt information.

In another possible design, the instructing, by the second processor if a first preset condition is met, the screen to stop displaying the prompt information specifically includes: if it is detected that duration during which the prompt information is displayed is greater than or equal to preset duration, instructing, by the second processor, the screen to stop displaying the prompt information; or if it is detected that light is blocked, instructing, by the second processor, the screen to stop displaying the prompt information; or if it is detected, in a handheld motion state, that a side of the electronic device faces upward, instructing, by the second processor, the screen to stop displaying the prompt information.

In another possible design, the instructing, by the second processor if a second preset condition is met, the screen to display the prompt information specifically includes: if the electronic device is lifted, instructing, by the second processor, the screen to display the prompt information; or if it is detected that the screen is touched, instructing, by the second processor, the screen to display the prompt information; or if a floating event is detected in the fingerprint recognition area or a preset area, instructing, by the second processor, the screen to display the prompt information; or if it is detected, in the handheld motion state, that a front side of the electronic device faces upward, instructing, by the second processor, the screen to display the prompt information; or if it is detected, in the handheld motion state, that the side of the electronic device faces upward and a pressure value in the fingerprint recognition area or a preset area is greater than or equal to a preset value, instructing, by the second processor, the screen to display the prompt information.

In another possible design, the first processor is an application processor AP, and the second processor is a coprocessor.

In another possible design, the second processor is configured to manage at least one sensor and/or the screen; and the instructing, by the second processor, the screen to display the prompt information or stop displaying the prompt information specifically includes: instructing, by the second processor based on detection data of the at least one sensor and/or an interrupt event of the screen, the screen to display the prompt information or stop displaying the prompt information.

In another possible design, after the first processor detects the screen-off event, the method further includes: sending, by the first processor, an instruction command to the second processor, where the instruction command includes a start command, and the start command is used to instruct to enable an always on display function; entering, by the first processor, a sleep state; after receiving the start command, triggering, by the second processor, a display subsystem DSS to be powered on; obtaining, by the DSS, to-be-displayed content of the prompt information according to a display rule; transmitting, by the DSS, the to-be-displayed content to the screen; and entering, by the DSS, a power-off state; and the instructing, by the second processor, the screen to display the prompt information specifically includes: instructing, by the second processor, the screen to display the prompt information based on the to-be-displayed content.

In another possible design, the electronic device includes a shared memory, and the shared memory is configured to store the to-be-displayed content of the prompt information; if the start command is a start command sent by the first processor for the first time, the instruction command further includes a display rule command, and the display rule command is used to indicate a display rule; and the obtaining, by the DSS, to-be-displayed content according to a display rule specifically includes: obtaining, by the DSS, the to-be-displayed content from the shared memory according to the display rule indicated by the display rule command.

In another possible design, the display rule command includes a display area setting command, and the display area setting command is used to indicate a position of a to-be-displayed area; the shared memory stores to-be-displayed content of a plurality of fingerprint identifiers; and the instructing, by the second processor, the screen to display prompt information specifically includes: sending, by the second processor, a display instruction to the screen; and displaying, by the screen, one of the plurality of fingerprint identifiers after receiving the display instruction.

In another possible design, after the entering, by the first processor, a sleep state, the method further includes: when the first processor is woken up by a screen-on event, sending, by the first processor, another instruction command to the second processor, where the another instruction command is a stop command, and the stop command is used to instruct to disable the always on display function.

In another possible design, the prompt information further includes at least one of time information, date information, power information, an SMS message prompt, a missed call prompt, or the like.

In another possible design, the prompt information further includes time information and date information, and when the start command is a start command sent by the first processor for the first time, the instruction command further includes a command for setting time and time zone formats, and the command for setting time and time zone formats is used to indicate time and time zone formats.

In another possible design, when the prompt information further includes other information, after the entering, by the first processor, a sleep state, the method further includes: entering, by the first processor, a wake-up state when the other information needs to be updated; sending, by the first processor, a start update command to the second processor; writing, by the first processor, to-be-displayed content of updated other information into the shared memory; sending, by the first processor, an end update command to the second processor; instructing, by the second processor, the DSS to be powered on; obtaining, by the DSS, the to-be-displayed content of the updated other information; transmitting, by the DSS, the to-be-displayed content of the updated other information to the screen; entering, by the DSS, the power-off state; and displaying, by the screen, the updated other information.

According to another aspect, an embodiment of this application provides a graphical user interface (graphical user interface, GUI) display method, where the method is implemented on an electronic device having a touchscreen, and the method includes: displaying, by the electronic device, a first GUI on the screen when the electronic device is in a screen-off state, where prompt information is displayed on the first GUI, the prompt information includes a fingerprint identifier, and the fingerprint identifier is used to indicate a fingerprint recognition area; and after the electronic device displays the first GUI on the screen, stopping, by the electronic device, displaying the first GUI on the screen in response to that a first preset condition is met. In this solution, in the screen-off state, the electronic device may intermittently and dynamically display the GUI including the prompt information such as the fingerprint identifier on the screen based on an actual requirement, to reduce power consumption of the electronic device.

In a possible design, after the stopping, by the electronic device, displaying the first GUI on the screen, the method further includes: displaying, by the electronic device, a second GUI on the screen in response to that a second preset condition is met, where the prompt information is displayed on the second GUI.

In another possible implementation, the stopping, by the electronic device, displaying the first GUI on the screen in response to that a first preset condition is met specifically includes: in response to that it is detected that duration during which the prompt information is displayed is greater than or equal to preset duration, stopping, by the electronic device, displaying the first GUI on the screen; or in response to that it is detected that light is blocked, stopping, by the electronic device, displaying the first GUI on the screen; or in response to that it is detected, in a handheld motion state, that a side of the electronic device faces upward, stopping, by the electronic device, displaying the first GUI on the screen.

In another possible implementation, the displaying, by the electronic device, a second GUI on the screen in response to that a second preset condition is met specifically includes: in response to that the electronic device is lifted, displaying, by the electronic device, the second GUI on the screen; or in response to that it is detected that the screen is touched, displaying, by the electronic device, the second GUI on the screen; or in response to that a floating event is detected in the fingerprint recognition area or a preset area, displaying, by the electronic device, the second GUI on the screen; or in response to that it is detected, in the handheld motion state, that a front side of the electronic device faces upward, displaying, by the electronic device, the second GUI on the screen; or in response to that it is detected, in the handheld motion state, that the side of the electronic device faces upward and a pressure value in the fingerprint recognition area or a preset area is greater than or equal to a preset value, displaying, by the electronic device, the second GUI on the screen.

In another possible implementation, the electronic device includes a first processor and a second processor, and when the electronic device is in a screen-on state or a screen-obscurity state, in response to that the first processor detects a screen-off event, the electronic device enters the screen-off state; the displaying, by the electronic device, a first GUI on the screen when the electronic device is in a screen-off state includes: instructing, by the second processor, the screen to display the first GUI; and the stopping, by the electronic device, displaying the first GUI on the screen after the electronic device displays the first GUI on the screen includes: instructing, by the second processor, the screen to stop displaying the first GUI.

In another possible implementation, the first processor is an application processor AP, and the second processor is a coprocessor.

In another possible implementation, the second processor is configured to manage at least one sensor and/or the screen; and the instructing, by the second processor, the screen to display the first GUI or stop displaying the first GUI specifically includes: instructing, by the second processor based on detection data of the at least one sensor and/or an interrupt event of the screen, the screen to display the first GUI or stop displaying the first GUI.

According to another aspect, an embodiment of this application provides an electronic device, including one or more processors and one or more memories. The one or more memories are coupled to the one or more processors, the one or more memories are configured to store computer program code, the computer program code includes a computer instruction, and when the one or more processors execute the computer instruction, the electronic device is enabled to perform the prompt information display method or the graphical user interface GUI display method in any possible design of any one of the foregoing aspects.

According to another aspect, an embodiment of this application provides a computer storage medium, including a computer instruction. When the computer instruction is run on an electronic device, the electronic device is enabled to perform the prompt information display method or the graphical user interface GUI display method in any possible design of any one of the foregoing aspects.

According to another aspect, an embodiment of this application provides a computer program product. When the computer program product is run on a computer, an electronic device is enabled to perform the prompt information display method or the graphical user interface GUI display method in any possible design of any one of the foregoing aspects.

BRIEF DESCRIPTION OF THE DRAWINGS

FIG. 13A and FIG. 13B are another schematic diagram of always on display according to an embodiment of this application;

DETAILED DESCRIPTION OF ILLUSTRATIVE EMBODIMENTS

Figure 1:
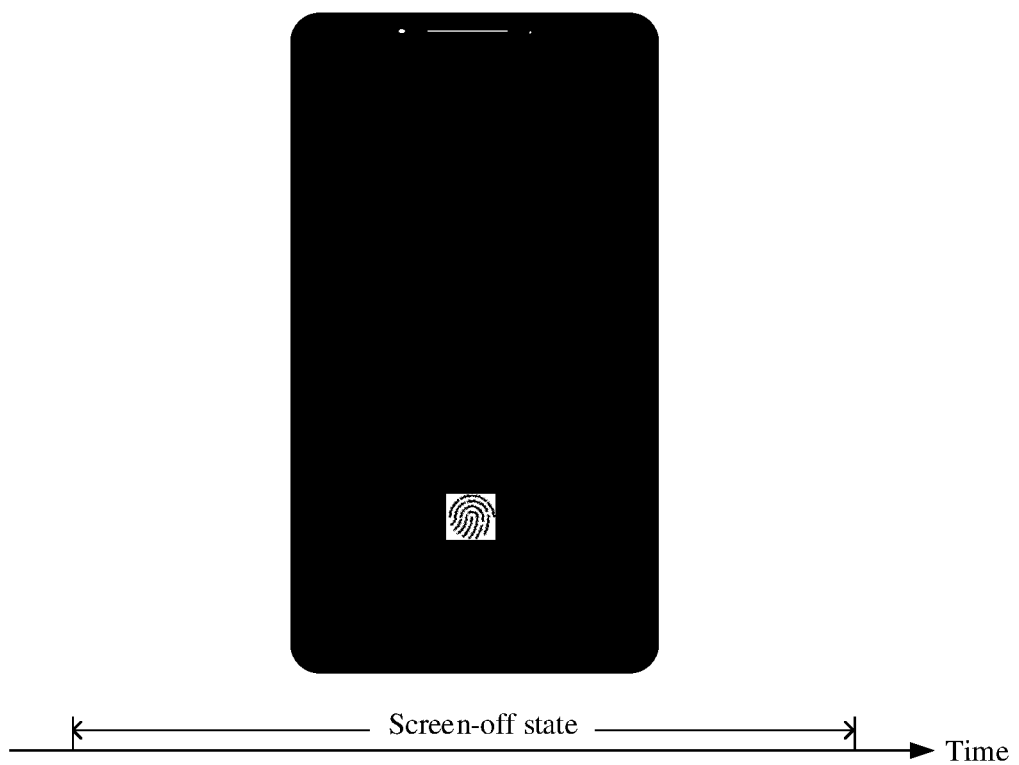
FIG. 1 is a schematic diagram of always on display in the prior art.

For ease of understanding, example descriptions of some concepts related to the embodiments of this application are provided for reference. Details are as follows:

Screen-off state: The screen-off state is also referred to as a screen-off state, and is a state of a screen of a mobile phone within a time period after an electronic device detects a screen-off event and before the electronic device detects a screen-on event.

Always on display: After a screen-off event is detected, a part of a screen is turned off, and the other part of the screen is turned on to display information such as a time or a notification. For a liquid crystal display (liquid crystal display, LCD), the screen may be turned off by turning off backlight of the screen. For an organic light emitting diode (organic light emitting diode, OLED), the screen may be turned off by controlling a light emitting point in the screen not to emit light.

Device node: One device node is actually one file. Therefore, the device node may also be referred to as a device file, and is used for inter-device access. For example, in Linux, all kinds of device access are performed by using files, and a device node is created by using an "mknod" command.

Driver (driver): A small code program is added to an operating system based on a configuration file compiled by the operating system. The configuration file includes information about hardware devices, and is used for communication between computer software (computer software) and hardware (hardware).

Inter-processor communication (inter processor communication, IPC): To meet high-end applications such as communication, multimedia, and digital processing, a system on chip integrates both one processor and a plurality of processors into a system, and even needs to cooperate with an off-chip processor. Because a plurality of processors are integrated into the system, each processor may be equivalent to one host of the system, and the processors communicate with each other on a shared resource. For example, manners of the inter-processor communication may include a shared memory communication mechanism, a mailbox hardware communication mechanism, a direct memory access (direct memory access, DMA) data transfer communication mechanism, and a serial port primary/secondary mode communication mechanism.

The following describes the technical solutions in the embodiments of this application with reference to the accompanying drawings in the embodiments of this application. In descriptions of the embodiments of this application, "/" means "or" unless otherwise specified. For example, A/B may represent A or B. In this specification, "and/or" describes only an association for describing associated objects and represents that three relationships may exist. For example, A and/or B may represent the following three cases: Only A exists, both A and B exist, and only B exists. In addition, in the descriptions in the embodiments of this application, "a plurality of" means two or more than two.

A prompt information display method provided in the embodiments of this application may be applied to any electronic device that can display a screen, such as a mobile phone, a tablet computer, a wearable device, a vehicle-mounted device, an augmented reality (augmented reality, AR) device/a virtual reality (virtual reality, VR) device, a notebook computer, an ultra-mobile personal computer (ultra-mobile personal computer, UMPC), a netbook, or a personal digital assistant (personal digital assistant, PDA). This is not limited in the embodiments of this application.

Figure 2:
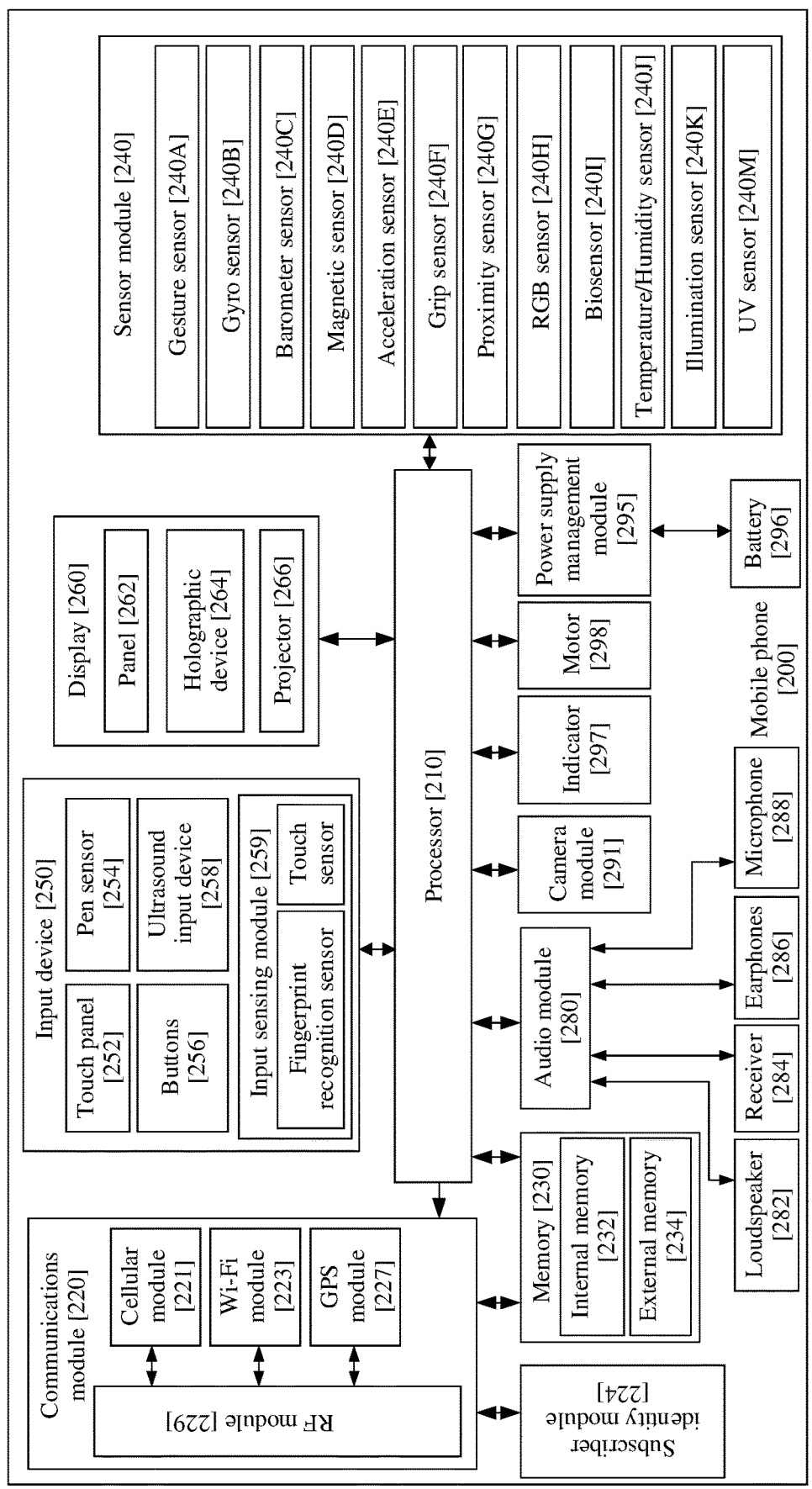
FIG. 2 is a schematic diagram of a hardware structure of a mobile phone according to an embodiment of this application.

An example in which the electronic device in the embodiments of this application is a mobile phone is used to describe a general hardware architecture of the mobile phone. As shown in FIG. 2, a mobile phone 200 may include a communications module 220, a memory 230, a sensor module 240, an input device 250, a display 260, an audio module 280, a processor 210, a camera module 291, a power management module 295, and the like. These components may be connected by using a bus, or may be directly connected. A person skilled in the art may understand that the structure of the mobile phone shown in FIG. 2 constitutes no limitation on the mobile phone, and may include more components than those shown in the figure, or combine some components, or have different component arrangements.

The communications module 220 is configured to communicate with another network entity, for example, receive information from a server or send related data to a server. The communications module 220 may include a radio frequency (radio frequency, RF) module 229, a cellular module 221, a wireless fidelity (wireless fidelity, WIFI) module 223, a GPS module 227, and the like. The RF circuit 229 may be configured to: receive or send information, or receive and send a signal in a call process; in particular, send received information to the processor 210 for processing; and send a signal generated by the processor 210. Usually, the RF circuit 21 may include but is not limited to an antenna, at least one amplifier, a transceiver, a coupler, a low noise amplifier (low noise amplifier, LNA), a duplexer, and the like. In addition, the RF circuit 21 may further communicate with a network and another device through wireless communication. The cellular module 221 and the Wi-Fi module 223 may be configured to connect to a network. The GPS module may be configured to perform positioning or navigation.

The processor 210 is a control center of the mobile phone 200, is connected to all parts of the entire mobile phone by using various interfaces and lines, and executes various functions of the mobile phone 200 and performs data processing by running or executing a software program and/or a module that are/is stored in the memory 230 and by invoking data stored in the memory 230, to perform overall monitoring on the mobile phone 200. During specific implementation, in an embodiment, the processor 210 may include one or more processing units. For example, the processor 210 may include an application processor AP and coprocessors such as a baseband processor and a sensor hub (sensorhub). The application processor may be configured to process an operating system, a graphical user interface, an application program, and the like. A modem processor mainly processes wireless communication. The baseband processor may be responsible for conventional functions of a mobile terminal, for example, mobile access and calling. In addition, the sensor hub may be configured to manage a sensor component of the mobile phone. For example, the sensor hub may be a low-speed (for example, about 80 MHz) and low-power consumption processor such as an ARM Cortex M3 or M4.

The memory 230 may be configured to store data, a software program, and a module, and may be a volatile memory (volatile memory) such as a random-access memory (random-access memory, RAM), or may be a non-volatile memory (non-volatile memory) such as a read-only memory (read-only memory, ROM), a flash memory (flash memory), a hard disk drive (hard disk drive, HDD), or a solid-state drive (solid-state drive, SSD), or may be a combination of the foregoing types of memories. Specifically, the memory 230 may store program code. The program code is used to enable the processor 210 to execute the program code, to perform the prompt information display method provided in the embodiments of this application. The memory 230 may include an internal memory 232 and an external memory 234.

The sensor module 240 may include a gesture sensor 240A, a gyroscope sensor 240B, a barometric pressure sensor 240C, a magnetic sensor 240D, an acceleration sensor 240E, and the like, may be configured to: detect acceleration of the mobile phone in various directions (usually, in three axes), and detect a magnitude and a direction of gravity when the mobile phone is still, and may be used in an application for identifying a posture of the mobile phone (such as a tilt angle of the mobile phone, front side facing upward, side facing upward, screen switching between a landscape mode and a portrait mode, a related game, magnetometer posture calibration, or motion), a vibration identification-related function (such as a pedometer, a knock, or motion), and the like. It should be noted that the mobile phone 200 may further include another sensor, for example, a grip sensor (which may be configured to detect whether the mobile phone is in a handheld state), a proximity sensor (which may identify proximity of an object by using a displacement sensor that is sensitive to the approaching object), an RGB sensor, a biosensor, a temperature/humidity sensor, an ambient light sensor (which may be configured to detect whether the mobile phone is in a pocket, a bag, or the like), or a UV sensor. Details are not described herein.

The input device 250 may include a touch panel (touch panel, TP) 252, a pen sensor 254, a button 256, an ultrasound input device 258, an input sensing module 259, and the like, to implement input and output functions of the mobile phone 200.

The display 260 may include devices such as a display panel 262, a holographic device 264, and a projector 266. The display panel 262 may be configured to display a graphical user interface (graphical user interface, GUI) on the mobile phone. The graphical user interface includes various application icons (icon), service icons, widgets (widget), identifiers, or the like. Specifically, the display 260 may be an LCD, an OLED, or the like having a touch function.

The touch panel 252 and the display panel 262 each may also be referred to as a touchscreen. The touchscreen may collect a touch operation performed by a user on or near the touchscreen (for example, an operation performed by a user on the touchscreen or near the touchscreen by using any proper object or accessory such as a finger or a stylus), and drive a corresponding connected apparatus based on a preset program. The touchscreen may be further configured to display information entered by the user or information provided for the user (for example, an image captured by a camera), and various menus of the mobile phone. For example, the touchscreen may be implemented by using a plurality of types such as a resistive type, a capacitive type, an infrared light sensing type, and an ultrasound wave type. This is not limited in the embodiments of the present invention.

An operation of the user near the touchscreen may be referred to as floating touch, and a touchscreen on which the floating touch can be performed may be implemented by using a capacitive type, an infrared light sensing type, an ultrasound wave type, and the like. For example, when a target such as a finger approaches or is away from a capacitive touchscreen, currents of a self-capacitance and a mutual capacitance on the touchscreen change accordingly, so that the electronic device can detect floating measurement and control. For another example, an infrared light sensing touchscreen may emit light by using an infrared light emitting diode. The mobile phone identifies and tracks a floating gesture by detecting screen light reflected back by a target such as a finger of the user.

The camera module 291 may be configured to collect an image to take a photo, record a video, scan a two-dimensional code/bar code, or the like, and may be further configured to perform facial information recognition, facial expression recognition of the user, head movement recognition of the user, or the like.

The audio module 280 may include a speaker 282, a receiver 284, a headset 286, a microphone 288, or the like. The user collects or plays an audio signal.

The power management module 295 may include a battery 296, configured to be logically connected to the processor 210 by using a power management system, to implement functions such as charging management, discharging management, and power consumption management by using the power management system.

In addition, the mobile phone 200 may further include function modules such as a subscriber identity module, an indicator, and a motor. Details are not described herein.

The prompt information display method provided in the embodiments of this application is described below in detail by using specific embodiments.

Figure 3:
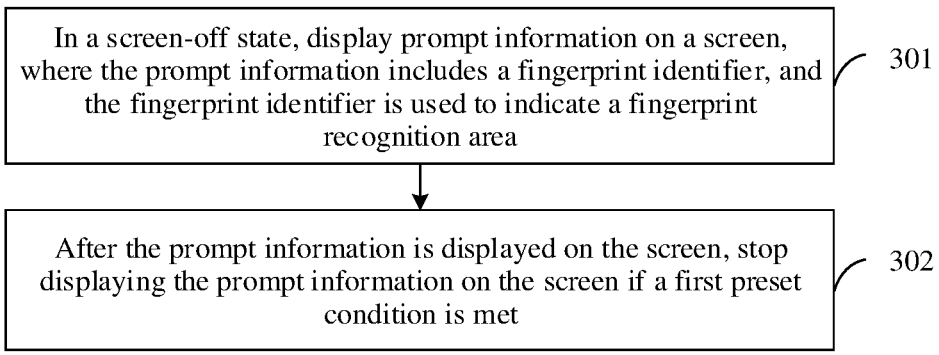
FIG. 3 is a flowchart of a prompt information display method according to an embodiment of this application.
Figure 4A:
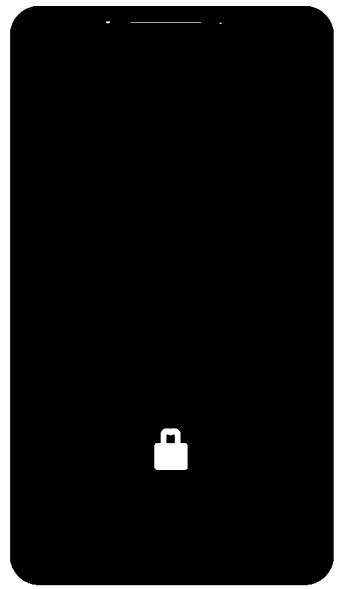
FIG. 4(*a*) to FIG. 4(*f*) are schematic diagrams of several fingerprint identifiers according to an embodiment of this application.
Figure 4B:
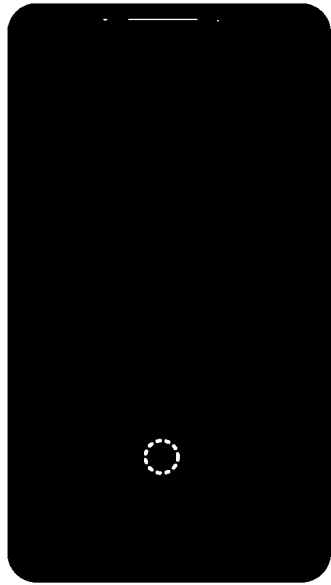
Figure 4C:
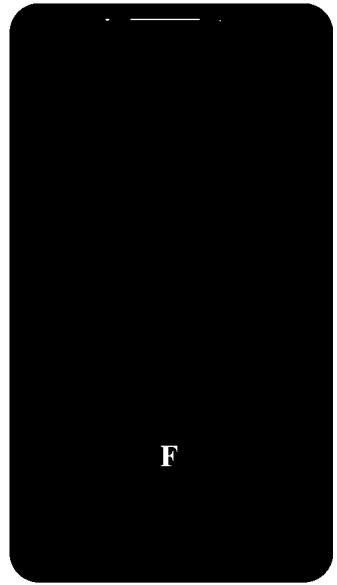
Figure 4D:
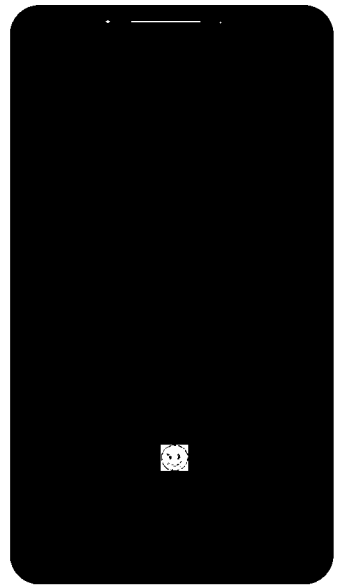
Figure 4E:
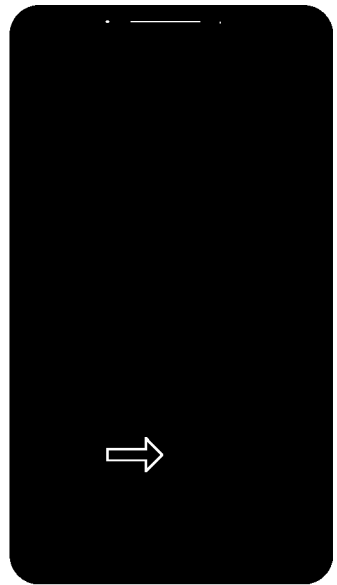
Figure 4F:
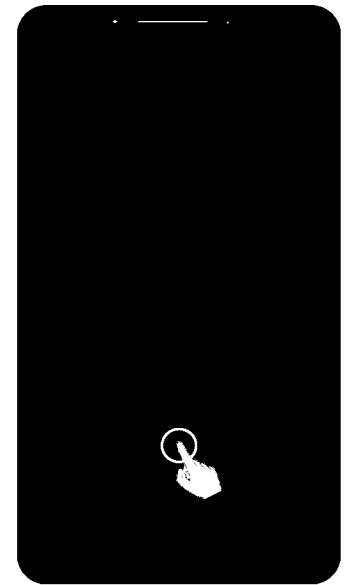

An embodiment of this application provides a prompt information display method, and the method may be applied to an electronic device having a touchscreen. Referring to FIG. 3, the method includes the following steps.

301. The electronic device displays prompt information on the screen when the electronic device is in a screen-off state, where the prompt information includes a fingerprint identifier, and the fingerprint identifier is used to indicate a fingerprint recognition area.

Specifically, the electronic device may detect a screen-off event by using an AP, and after detecting the screen-off event, the electronic device turns off a part of the screen or the entire screen, and enters the screen-off state. For example, that the electronic device detects the screen-off event may include: The electronic device detects, in a screen-on state or a screen-obscurity state, that a power button is pressed. Alternatively, the electronic device detects no operation of a user within a preset time period (for example, one minute) in a screen-on state or a screen-obscurity state. Alternatively, the electronic device detects a preset screen-off gesture (for example, double-tap on a desktop) in a screen-on state or a screen-obscurity state. Alternatively, the electronic device detects, in a screen-on state or a screen-obscurity state, that light is blocked (for example, a mobile phone is placed into a pocket or a bag). In the screen-on state, if the electronic device detects no input operation of the user within a preset time period, overall screen luminance is reduced. In this case, the electronic device enters the screen-obscurity state. In the screen-obscurity state, if the electronic device still detects no input operation of the user, the electronic device enters the screen-off state after staying in the screen-obscurity state for a relatively short time (for example, several seconds). If the electronic device detects an input operation of the user, the electronic device enters the screen-on state again. It should be noted that the screen-off event used to instruct the electronic device to turn off the screen may further include another event. Details are not described herein.

The fingerprint identifier used to identify the fingerprint recognition area may be in a plurality of forms. This is not specifically limited in this embodiment of this application. For example, the fingerprint identifier may be a fingerprint pattern shown in FIG. 1, or a lock-shaped pattern shown in FIG. 4(*a*), or a circle, dot, or ball pattern shown in FIG. 4(*b*), or a smiley pattern shown in FIG. 4(*c*), or an indication character shown in FIG. 4(*d*). A position of the pattern or the character is used to indicate the fingerprint recognition area, an area covered by the pattern or the character intersects with the fingerprint recognition area, and the fingerprint recognition area is a corresponding area of a fingerprint recognition component on the screen. Alternatively, the fingerprint identifier may be an indication arrow shown in FIG. 4(*e*) or a guide gesture shown in FIG. 4(*f*), and a position to which the indication arrow or the guide gesture points is used to indicate the fingerprint recognition area. Alternatively, the fingerprint identifier may be an animation play area, and a position of the animation play area is used to indicate the fingerprint recognition area or the like.

Specifically, an area in which the fingerprint identifier is located may completely include an area covered by the fingerprint recognition component inside or behind the screen. Herein, both "inside the screen" and "behind the screen" indicate that the fingerprint area is located inside the screen instead of on a surface of the screen, and indicate a same meaning. In the following, "inside the screen" is used for description. Alternatively, an area in which the fingerprint identifier is located may be completely included in an area covered by the fingerprint recognition component inside the screen. Alternatively, an area in which the fingerprint identifier is located partially intersects with an area covered by the fingerprint recognition component inside the screen. Alternatively, a distance between an area in which the fingerprint identifier is located and an area covered by the fingerprint recognition component inside the screen is less than or equal to a preset distance value. To be specific, the area in which the fingerprint identifier is located is near the area covered by the fingerprint recognition component inside the screen, or the area in which the fingerprint identifier is located is adjacent to the area covered by the fingerprint recognition component inside the screen.

After entering the screen-off state, the electronic device may display the prompt information on the screen. Specifically, after entering the screen-off state, the electronic device may first display the prompt information on the screen by default, or the electronic device may not first display the prompt information, but display the prompt information on the screen only when a second preset condition is met.

302. After the electronic device displays the prompt information on the screen, the electronic device stops displaying the prompt information on the screen if a first preset condition is met.

In the screen-off state, after the electronic device displays the prompt information on the screen, the electronic device stops displaying the prompt information on the screen when the first preset condition is met.

Figure 5:
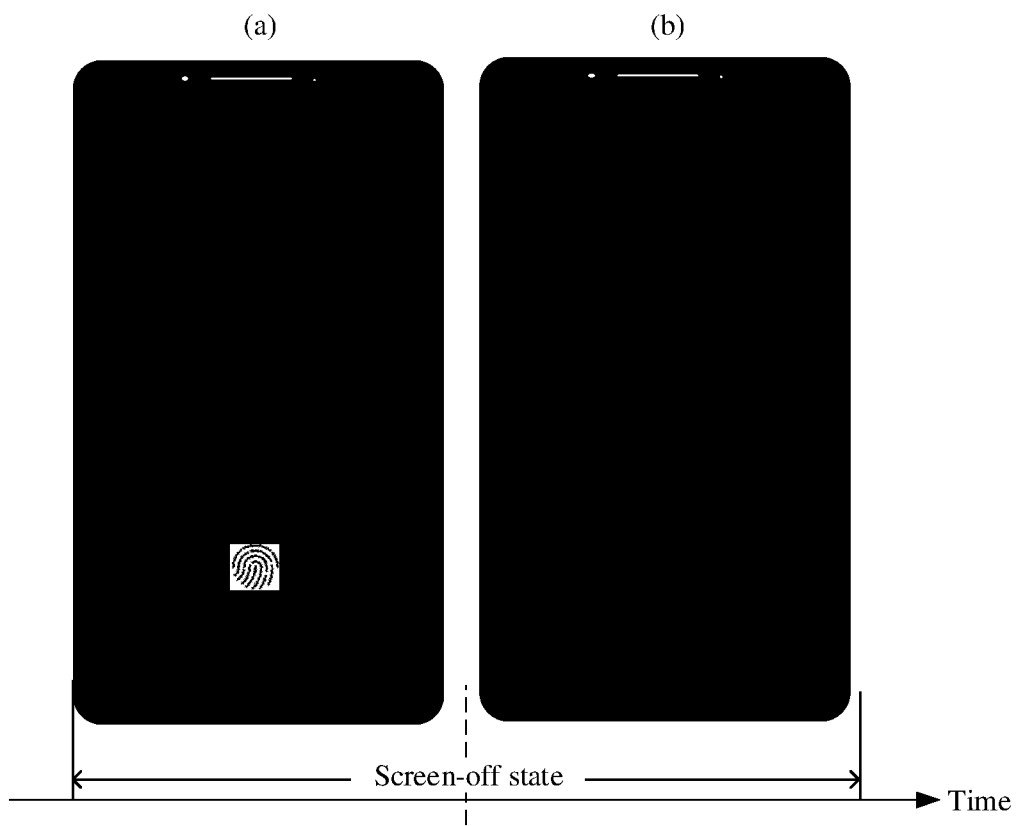
FIG. 5 is a schematic diagram of always on display according to an embodiment of this application.

In other words, in the screen-off state, referring to FIG. 5, the electronic device may display the prompt information within a time period. In this case, the electronic device is in an always on display state. However, the electronic device may not display the prompt information within another time period. In this case, the electronic device may exit the always on display state. In other words, the electronic device may enter or exit the always on display state based on an actual requirement, to intermittently and dynamically display the prompt information such as the fingerprint identifier on the screen, instead of staying in the always on display state in the screen-off state to always display a fingerprint icon like in the prior art. Therefore, power consumption of the electronic device can be reduced.

Further, after step 302, the method may further include the following step:

303. The electronic device displays the prompt information on the screen if the second preset condition is met.

After the electronic device stops displaying the prompt information on the screen, the electronic device may display the prompt information on the screen again if the second preset condition is met.

Figure 6:
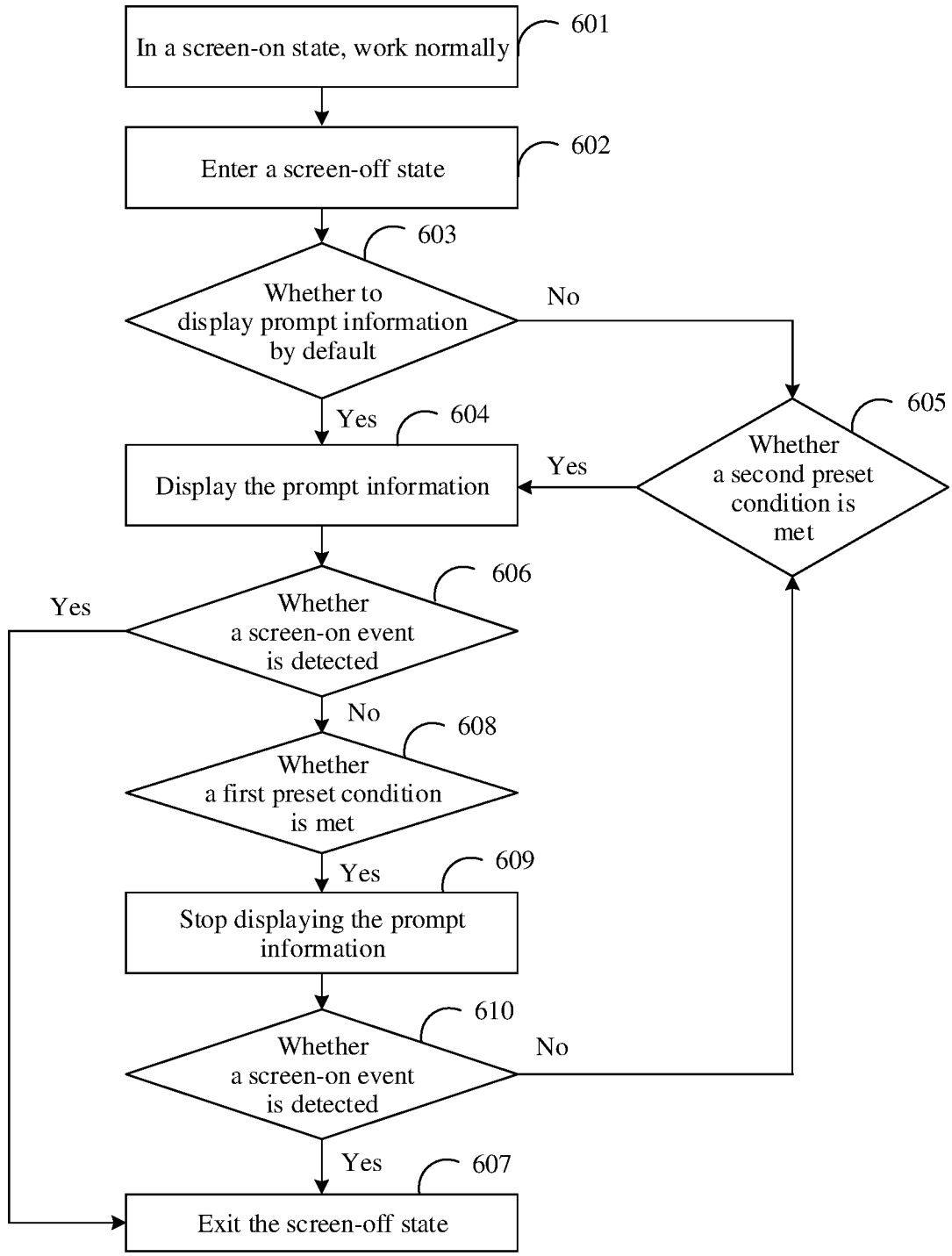
FIG. 6 is a flowchart of another prompt information display method according to an embodiment of this application.

FIG. 6 is a flowchart of another prompt information display method according to an embodiment of this application. The method includes the following steps: 601. An electronic device works normally in a screen-on state. 602. When the electronic device detects a screen-off event, the electronic device enters a screen-off state. 603. After entering the screen-off state, the electronic device determines whether to display prompt information by default, and if yes, performs step 604, or if no, performs step 605. 604. If the prompt information is displayed by default, the electronic device displays the prompt information on a screen, and then performs step 606. 605. If the prompt information is not displayed by default, the electronic device determines whether a second preset condition is met, and if the second preset condition is met, the electronic device performs step 604 to display the prompt information on the screen, or if the second preset condition is not met, the electronic device does not display the prompt information, and may always determine whether the second preset condition is met. 606. After displaying the prompt information, the electronic device determines whether a screen-on event is detected, and if yes, performs step 607, or if no, performs step 608. 607. If the screen-on event is detected in step 606, the electronic device exits the screen-off state. 608. If the screen-on event is not detected in step 606, the electronic device determines whether a first preset condition is met, and if yes, performs step 609, or if no, may always detect whether the first preset condition is met. 609. If the first preset condition is met, the electronic device stops displaying the prompt information on the screen. 610. After the electronic device stops displaying the prompt information on the screen, the electronic device determines whether a screen-on event is detected, and if the screen-on event is detected in step 610, the electronic device performs step 607 to exit the screen-off state, or if the screen-on event is not detected in step 610, the electronic device performs step 605 to determine whether the second preset condition is met. The foregoing steps are cyclically performed until the electronic device exits the screen-off state.

In this embodiment of this application, the electronic device may include a first processor and a second processor. The first processor may be an application processor AP, and the second processor is a coprocessor. There may be a plurality of coprocessors that can be used as the second processor in this embodiment of this application. In the following embodiments of this application, an example in which the second processor is a coprocessor sensor hub is used for description. When the electronic device is in the screen-on state or a screen-obscurity state, if the AP detects a screen-off event, the electronic device may enter the screen-off state. In the screen-off state, the electronic device may instruct, by using the sensor hub, the screen to display the prompt information or stop displaying the prompt information.

In the screen-off state, the AP may enter a sleep state, and the electronic device may manage and control, by using the sensor hub, display and closing of the prompt information. Compared with the AP, the sensor hub is a low-speed and low-power consumption coprocessor, for example, may be specifically an ARM cortex M3 or M4. Therefore, compared with the prior art in which in the screen-off state, the AP is in a wake-up state to control a fingerprint icon to be always displayed, in this embodiment of this application, the low-power consumption coprocessor sensor hub manages and controls display of a fingerprint identifier, so that power consumption of the electronic device can be reduced.

In addition, in this embodiment of this application, in the screen-off state, the electronic device can intermittently and dynamically display the fingerprint identifier by using the low-power consumption coprocessor sensor hub, so that power of the electronic device can be significantly saved.

Specifically, the sensor hub may be configured to manage at least one sensor and/or the screen. That the electronic device displays the prompt information or stops displaying the prompt information on the screen may specifically include: The sensor hub instructs, based on detection data of the at least one sensor and/or an interrupt event of the screen, the screen to display the prompt information or stop displaying the prompt information. For example, when the electronic device is a mobile phone, the at least one sensor may include the sensor shown in FIG. 2. The interrupt event of the screen may include a floating event, a touch event, or the like.

For example, in this embodiment of this application, the second preset condition may include any one or any combination of a plurality of the following conditions: The electronic device is lifted; or the electronic device detects that the screen is touched; or the electronic device detects a floating event in a fingerprint recognition area or a preset area; or the electronic device detects, in a handheld motion state, that a front side of the electronic device faces upward; or the electronic device detects, in a handheld motion state, that a side of the electronic device faces upward and a pressure value in a fingerprint recognition area or a preset area is greater than or equal to a preset value.

Figure 7:
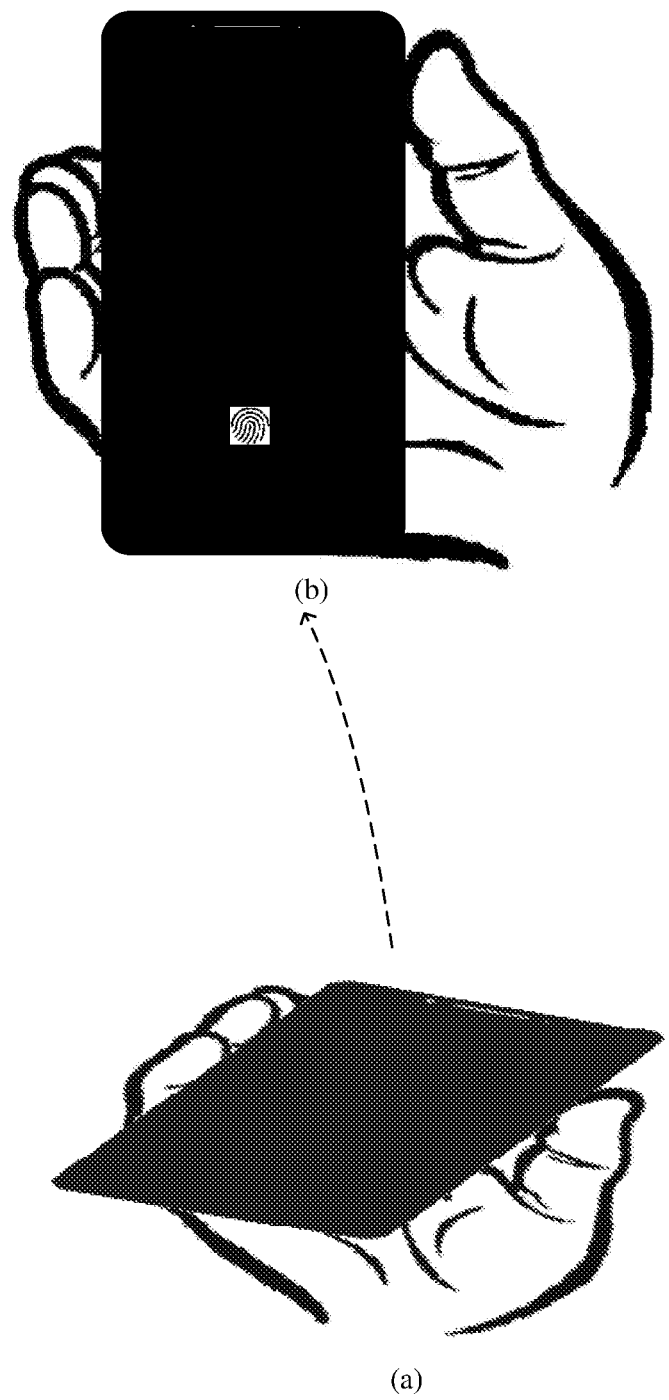
FIG. 7 is another schematic diagram of always on display according to an embodiment of this application.

In a specific implementation, referring to FIG. 7, in a state in which the prompt information is not displayed, if the electronic device detects that the electronic device is lifted, the electronic device displays the prompt information.

For example, when being placed still or horizontally, the electronic device may stop displaying the fingerprint identifier after displaying the fingerprint identifier for preset duration. When the electronic device is lifted, the electronic device may display the fingerprint identifier again.

Specifically, the sensor hub may determine, by using detection data of a sensor (for example, an acceleration sensor and/or a gyroscope), whether the electronic device is lifted, so that when being lifted, the electronic device instructs the screen to display the fingerprint identifier.

Figure 8:
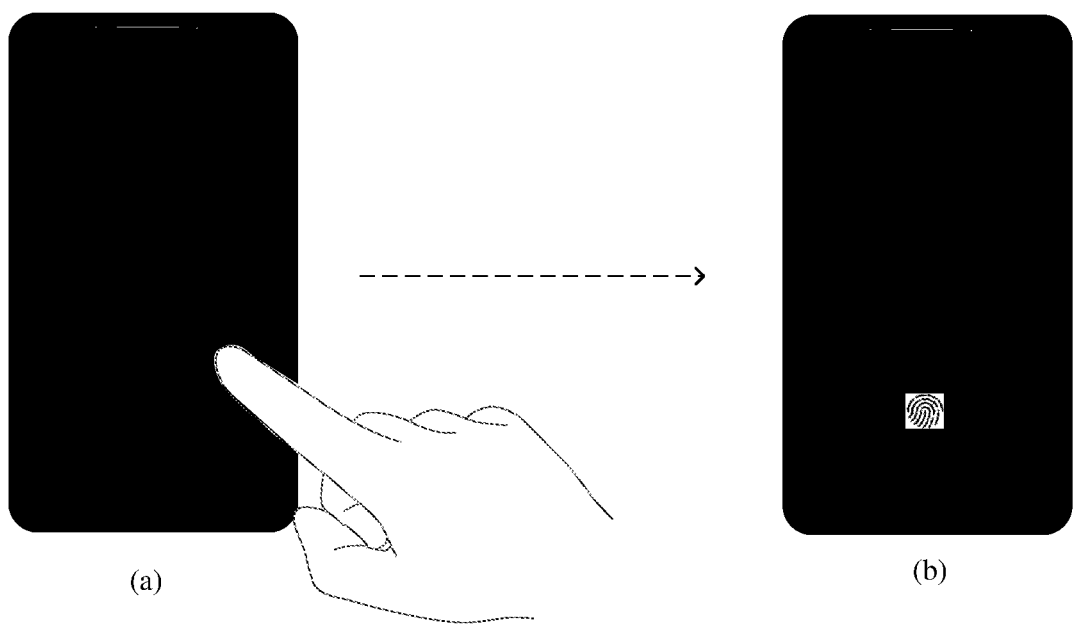
FIG. 8 is another schematic diagram of always on display according to an embodiment of this application.

In another specific implementation, referring to FIG. 8, in a state in which the prompt information is not displayed, if the electronic device detects that the screen is touched, the electronic device displays the prompt information.

Specifically, the sensor hub may determine, by using the screen (for example, a capacitive, inductive, or infrared touchscreen), whether a touch event by a finger or an electronic pen occurs. When the touch event occurs, it may indicate that a user actively triggers display of the prompt information, and the screen generates a touch interrupt event and notifies the sensor hub of the touch interrupt event, so that the sensor hub instructs the screen to display the fingerprint identifier.

In another specific implementation, in a state in which the prompt information is not displayed, if the electronic device detects the floating event in the fingerprint recognition area or the preset area (for example, an area near the fingerprint recognition area, a lower half of the screen, a middle area of the screen, or a lower left corner or a lower right corner of the screen), the electronic device displays the prompt information.

Specifically, the sensor hub may determine, by using detection data of a distance sensor or the screen (for example, a change of a capacitance on a capacitive touchscreen), whether a finger floating event occurs above the fingerprint recognition area or the preset area. When the floating event occurs, the distance sensor or the touchscreen generates a floating interrupt event and notifies the sensor hub of the floating interrupt event, so that the sensor hub instructs the screen to display the fingerprint identifier.

Figure 9:
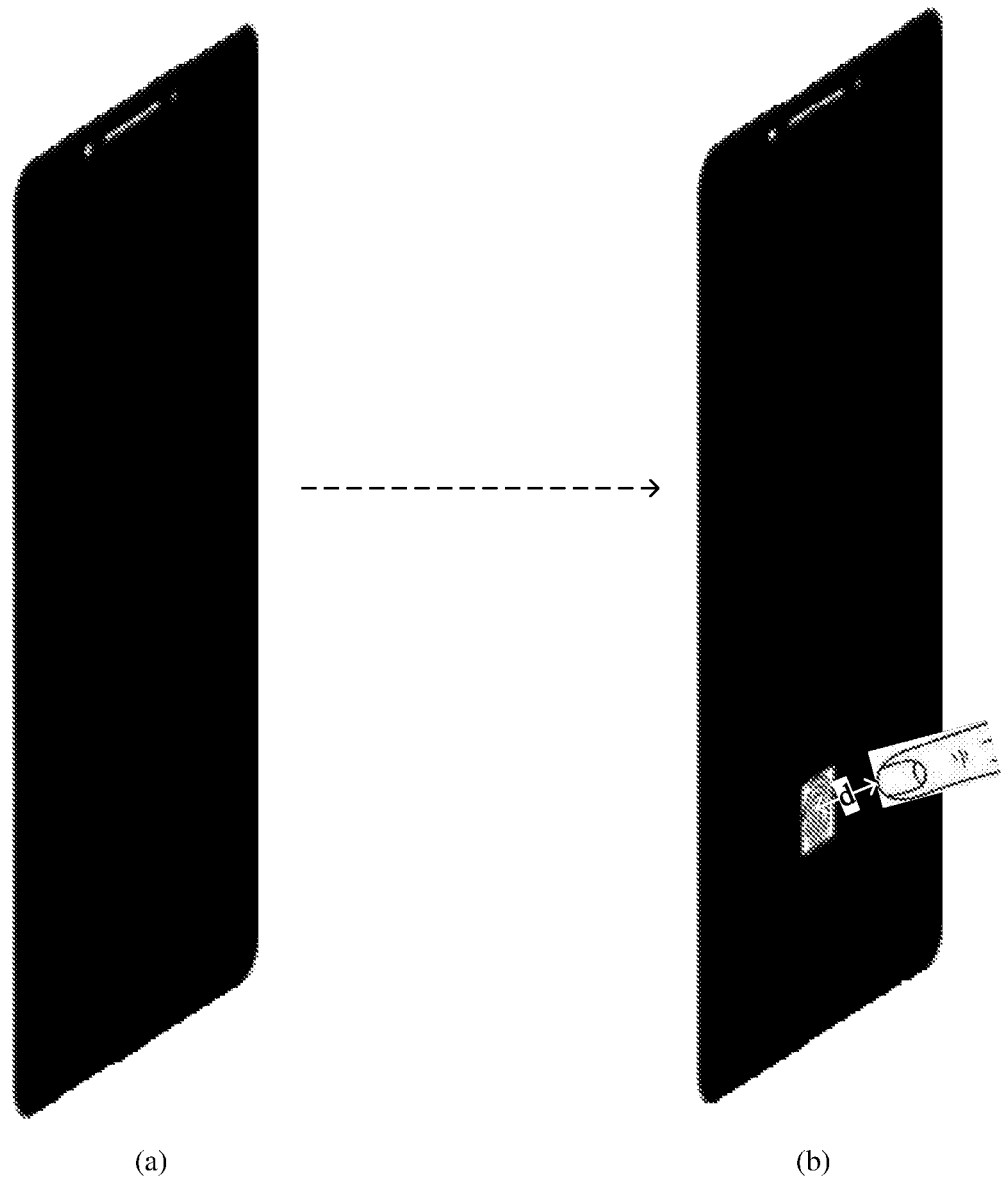
FIG. 9 is another schematic diagram of always on display according to an embodiment of this application.

For example, referring to FIG. 9, in a state in which the prompt information is not displayed, if the electronic device detects the finger floating event when a distance between a finger and the fingerprint recognition area on the screen is d, the electronic device displays the fingerprint identifier.

In another specific implementation, in a state in which the prompt information is not displayed, the electronic device displays the prompt information when the electronic device is "shaken".

Specifically, when the sensor hub determines, by using detection data of a vibration sensor or an acceleration sensor, that the electronic device is "shaken", the sensor hub may instruct the screen to display the prompt information.

In another specific implementation, in a state in which the prompt information is not displayed, the electronic device displays the prompt information when detecting that light is brightened.

For example, when the electronic device is taken out from a pocket or a bag, the user may want to use the electronic device. When the electronic device detects that light is brightened, the electronic device may display the fingerprint identifier, so that the user unlocks the electronic device.

Specifically, the sensor hub may determine, based on detection data of an ambient light sensor, whether light is brightened, to determine whether the electronic device is taken out of a pocket or a bag, and further instruct the screen whether to display the fingerprint identifier.

In another specific implementation, when the electronic device is in the handheld motion state and does not display the prompt information, if the electronic device detects that the front side of the electronic device faces upward, the electronic device displays the prompt information.

The front side of the electronic device is a side on which the screen of the electronic device is located. The user usually uses the electronic device only when the side on which the screen of the electronic device is located faces upward. Therefore, when the side on which the screen of the electronic device is located faces upward, the electronic device may display the prompt information.

Figure 10A:
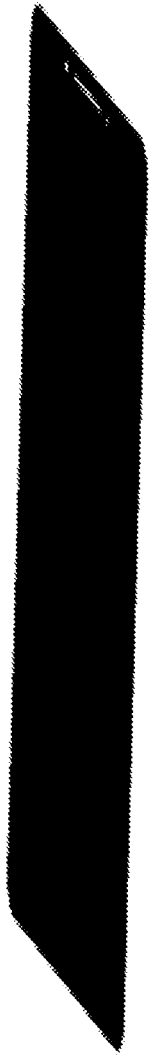
FIG. 10(*a*) and FIG. 10(*b*) are another schematic diagram of always on display according to an embodiment of this application.
Figure 10B:
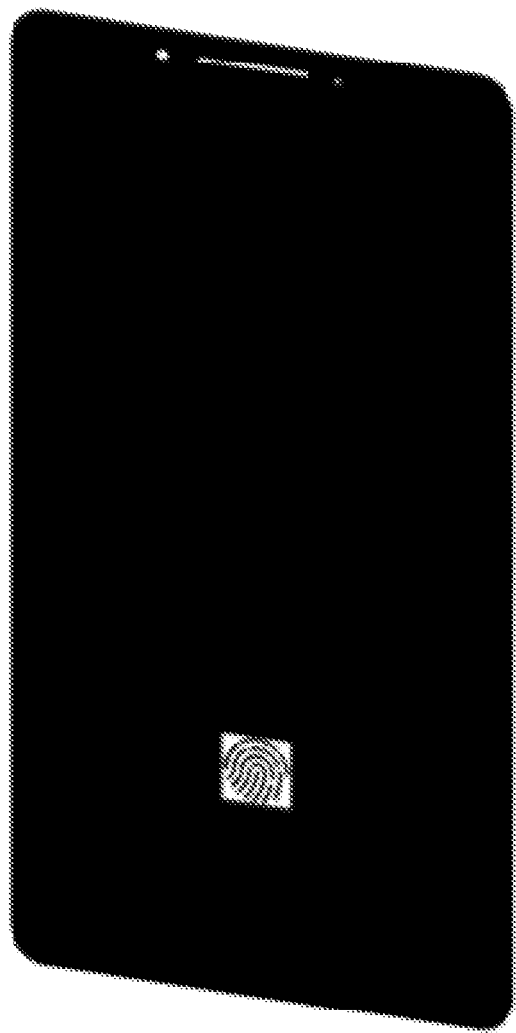

It should be noted that, that the front side of the electronic device faces upward means that the front side of the electronic device basically faces upward, including a case, shown in FIG. 10(*b*), in which the front side of the electronic device does not completely face upwards.

Specifically, in the handheld motion state, the user usually holds the electronic device laterally when being in motion, to be specific, the side of the electronic device basically faces upward. The user usually flips the mobile phone over when the user needs to use the mobile phone, so that the front side of the electronic device basically faces upward. The sensor hub may determine, by using an acceleration sensor and a pressure sensor, whether the electronic device is in the handheld motion mode, and determine, by using a gyroscope, whether the front side of the electronic device basically faces upward. When the front side of the electronic device basically faces upward, the sensor hub instructs the screen to display the fingerprint identifier.

For example, when the electronic device is flipped from a posture, shown in FIG. 10(*a*), that the side faces upward to a posture, shown in FIG. 10(*b*), that the side faces upward, the electronic device displays the fingerprint identifier.

In another specific implementation, when the electronic device is in the handheld motion state and does not display the prompt information, if the electronic device detects that the side of the electronic device faces upward and the pressure value in the fingerprint recognition area or the preset area is greater than or equal to the preset value, the electronic device displays the prompt information.

Figure 11A:
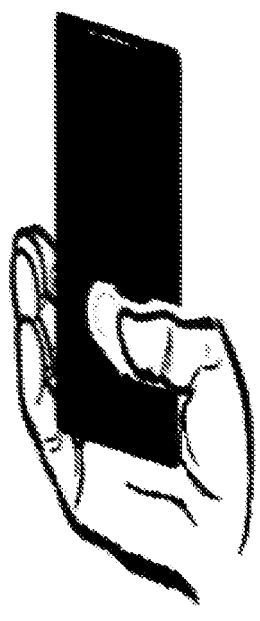
FIG. 11(*a*) and FIG. 11(*b*) are another schematic diagram of always on display according to an embodiment of this application.
Figure 11B:
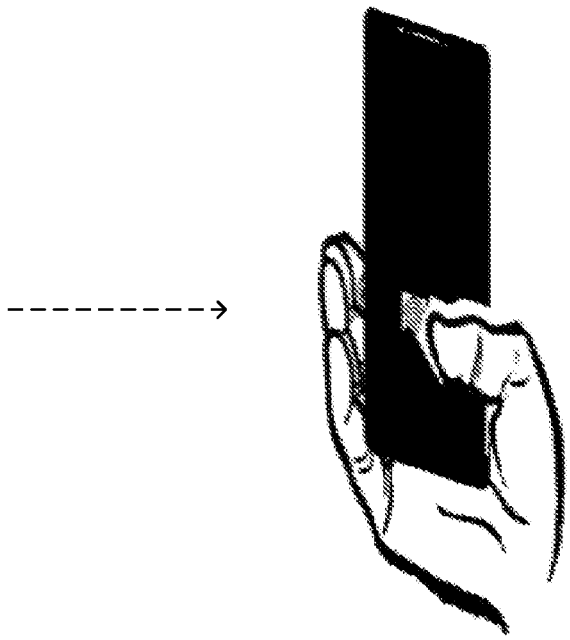

In a motion state, when the side of the electronic device faces upward, the user laterally holds the electronic device, and the user usually does not use the electronic device when laterally holding the electronic device. Therefore, if the user laterally holds the electronic device in the motion state, and the electronic device detects a touch in the fingerprint recognition area or the preset area, the touch may be an unconscious accidental touch of the user. Therefore, the electronic device may not display the fingerprint identifier. However, referring to FIG. 11(a), when it is detected that a pressure value of a touch is greater than or equal to a preset value (that is, pressure pressing), it may indicate that the user consciously triggers the touch. In this case, referring to FIG. 11(b), the electronic device may display the fingerprint identifier. In this way, a probability of an accidental trigger can be reduced, and display power consumption can be reduced.

Alternatively, if the user laterally holds the electronic device in a motion state, the electronic device detects a touch in the fingerprint recognition area or the preset area, and duration of the touch is greater than or equal to preset duration (that is, touching and holding), it may indicate that the user consciously triggers the touch, and the electronic device may display the fingerprint identifier.

Alternatively, if the user laterally holds the electronic device in a motion state, and the electronic device detects another event different from a simple touch, for example, a double-tap event, in the fingerprint recognition area or the preset area, it may indicate that the user consciously triggers the event, and the electronic device displays the fingerprint identifier.

In a non-motion state, for example, when the user is standing or lying, if the user laterally holds the electronic device and a touch is detected in the fingerprint recognition area or the preset area, the touch is usually a conscious touch of the user. Therefore, the electronic device may display the fingerprint identifier.

In another specific implementation, when the electronic device is flipped from a posture that the front side faces upward to a posture that a back side faces upward (that is, the back side of the electronic device faces upward) and then is flipped back to the posture that the front side faces upward, the electronic device displays the prompt information.

In another specific implementation, when receiving a first voice instruction (for example, to display the prompt information or a prompt) of the user, the electronic device displays the prompt information.

For example, in this embodiment of this application, the first preset condition may include any one or any combination of a plurality of the following conditions: The electronic device detects that duration for which the prompt information is displayed is greater than or equal to preset duration; or the electronic device detects that light is blocked; or the electronic device detects, in the handheld motion state, that the side of the electronic device faces upward.

In a specific implementation, in a state in which the prompt information is displayed, if the electronic device detects that current display duration is greater than or equal to the preset duration, the electronic device stops displaying the prompt information.

Specifically, in the state in which the prompt information is displayed, for example, in a state in which the electronic device displays the prompt information when being placed still or horizontally (for example, placed on a table, on a bed, or in a vehicle), if the sensor hub determines that display duration is greater than or equal to the preset duration (for example, 5 s), it may indicate that the user does not want to use the electronic device, or otherwise, the user has performed fingerprint unlocking within the preset duration. Therefore, the sensor hub may instruct the screen to stop displaying the fingerprint identifier.

In another specific implementation, in a state in which the prompt information is displayed, if the electronic device detects that display duration exceeds the preset duration and no user input operation is detected, the electronic device stops displaying the prompt information. The user input operation may include a touch operation, a floating operation, a button operation, a voice operation, or the like. The touch operation and the floating operation each may be specifically an operation by a finger or an operation by an electronic pen. This is not specifically limited herein.

In another specific implementation, in a state in which the prompt information is displayed, if the electronic device detects that light is blocked, the electronic device stops displaying the prompt information.

For example, when the electronic device is placed into a pocket or a bag, and the user does not want to use the electronic device, the electronic device may detect that light is blocked, and therefore does not display the fingerprint identifier. If the electronic device displays the fingerprint identifier before being placed into a pocket or a bag, the electronic device may stop displaying the fingerprint identifier after being placed into the pocket or the bag. If the electronic device does not display the fingerprint identifier before being placed into a pocket or a bag, the electronic device does not display the fingerprint identifier after being placed into the pocket or the bag.

Specifically, the sensor hub may determine, based on detection data of a proximity sensor, an ambient light sensor, and the like, whether light is blocked and a distance between the electronic device and another object, to determine whether the electronic device is placed into a pocket or a bag, and further instruct the screen whether to stop displaying the fingerprint identifier.

In another specific implementation, when the electronic device is in the handheld motion state and displays the prompt information, if the electronic device detects that the side of the electronic device faces upward, the electronic device stops displaying the prompt information.

It can be learned from the foregoing analysis that, in a motion state, when the side of the electronic device faces upward, the user laterally holds the electronic device, and the user usually does not use the electronic device when laterally holding the electronic device. The sensor hub may determine, by using an acceleration sensor and a pressure sensor, whether the electronic device is in the handheld motion state, and determine, by using a gyroscope, whether the side of the electronic device basically faces upward. When the side of the electronic device basically faces upward, the sensor hub does not display the fingerprint identifier.

For example, when the electronic device is flipped from a posture that the front side basically faces upward to a posture that the side basically faces upward, the electronic device stops displaying the fingerprint identifier.

In another specific implementation, regardless of whether the electronic device is in the handheld motion state, when the front side of the electronic device basically faces upward, the electronic device displays the prompt information. When the side of the electronic device basically faces upward, the electronic device stops displaying the prompt information.

In another specific implementation, when receiving a second voice instruction (for example, to close or stop displaying the prompt information or not to display the prompt information) of the user, the electronic device stops displaying the prompt information.

In another specific implementation, the electronic device may not display the prompt information by default, but displays the prompt information only when a preset condition is met.

That the preset condition is met may indicate that the user may want to use the electronic device. A specific case in which the preset condition is met may be one or a combination of a plurality of the foregoing specific implementations of displaying the fingerprint identifier (for example, a touch event is detected or the first voice instruction is detected). In this way, in the screen-off state, the electronic device may usually not display the fingerprint identifier in most cases, but displays the fingerprint identifier only if necessary. Therefore, more power consumption of the electronic device can be reduced.

It should be noted that a specific implementation, described in this embodiment of this application, in which the electronic device displays or stops displaying the fingerprint identifier in the screen-off state is merely an example for description, and may further include another specific implementation in which the electronic device displays or stops displaying the fingerprint identifier, or may be a combination of two or more implementations. For example, when the fingerprint identifier is not displayed, the electronic device may display the fingerprint identifier when the electronic device is lifted and a floating event is detected. Details are not described herein.

In the screen-on state, the AP manages and controls normal working of the entire electronic device. In the screen-off state, the sensor hub replaces the AP to manage and control display of the prompt information. An interface protocol (or referred to as a communication mechanism) used for information exchange is set between the AP and the sensor hub.

The interface protocol may include an instruction command and a transmission channel, and may further include a sending occasion, a function, and the like of the instruction command. The instruction command may include one or more of a start command, a stop command, a display rule command, an initialization command, or the like. The display rule command is used to indicate a display rule, for example, may include at least one of a display area configuration command or an image size setting command. The display area configuration command may be used to notify the sensor hub of a position of a to-be-displayed area, and the image size setting command may be used to notify the sensor hub of a size (for example, a pixel size) of an image that can be displayed. In addition, the instruction command may be specifically in a form of a command word that can be identified by a machine. The instruction command may have a specific parameter format. For example, the command may include a name, a parameter (type), and a value (value). For example, for a specific format of the display area configuration command, refer to Table 1.

The transmission channel may be AP-IPC-sensor hub. To be specific, the AP and the sensor hub may exchange information such as a command with each other through an IPC channel, to implement communication between the AP and the sensor hub.

The following specifically describes the sending occasion and the function of the instruction command.

Figure 12:
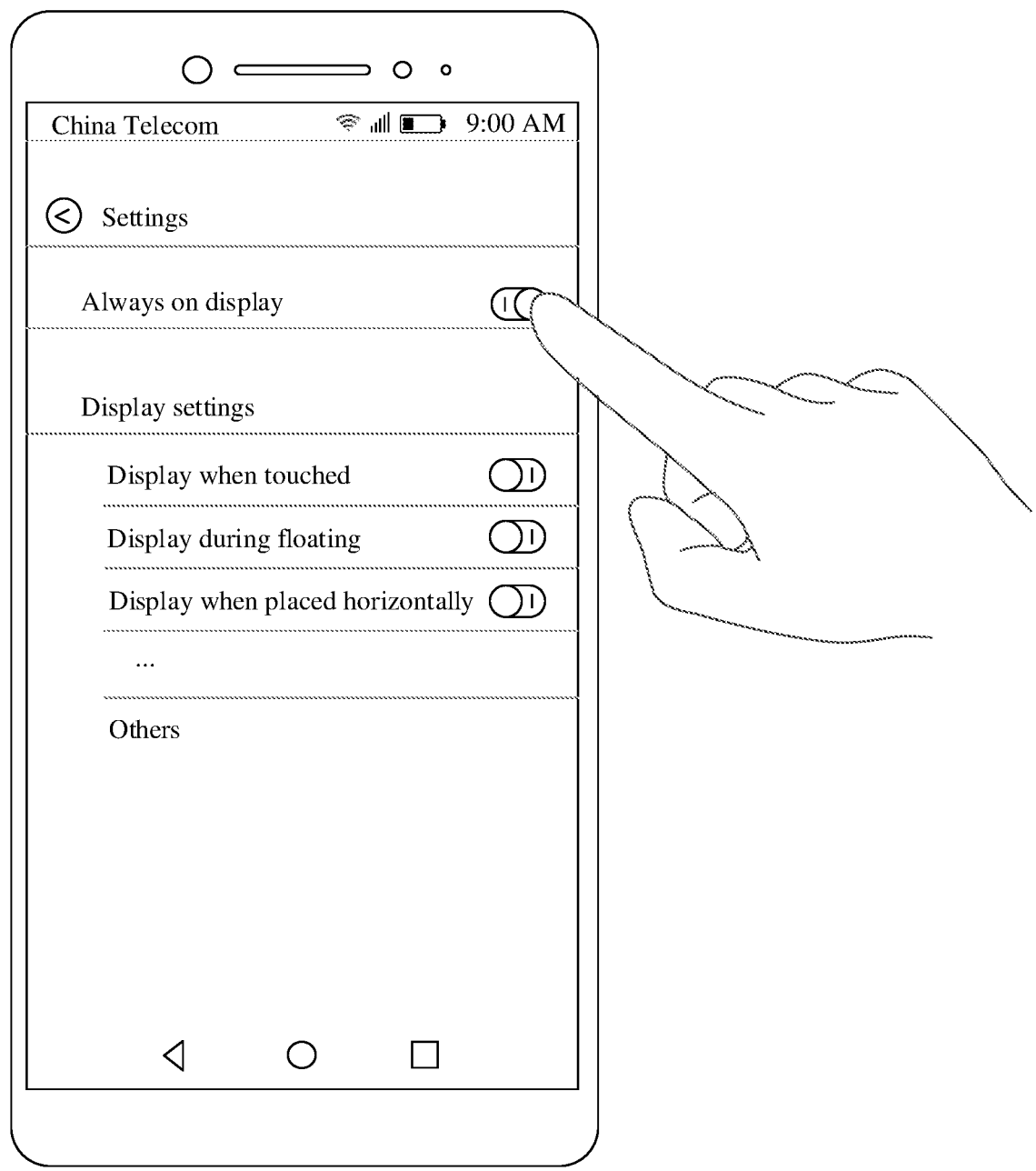
FIG. 12 is a schematic diagram of a settings screen of always on display according to an embodiment of this application.

The AP sends a start command to the sensor hub after detecting a screen-off event. After receiving the start command sent by the AP, the sensor hub enables an always on display function. If the start command is a start command sent by the AP for the first time, the AP may further send an initialization command to the sensor hub, to initialize modules for always on display on an AP side and a sensor hub side. In addition, the AP may further send a display rule command to the sensor hub, to notify the sensor hub of a display rule of prompt information. A start command sent by the AP for the first time after the AP is powered on or after the user turns on an always on display switch (for example, an always on display switch on a settings screen shown in FIG. 12) on the electronic device may be referred to as a start command sent by the AP for the first time. After sending the start command (and the initialization command and the display rule command), the AP may enter the sleep state, to reduce power consumption of the electronic device.

Specifically, the AP may send the start command, the initialization command, and the display rule command to the sensor hub through the IPC channel. After receiving the initialization command, the sensor hub may initialize all modules for always on display that are managed and controlled by the sensor hub, for example, a display subsystem DSS. After receiving the start command, the sensor hub may enable the always on display function. After receiving the start command for the first time, the sensor hub may send feedback information to the AP through the IPC channel, to establish a communication channel between the AP and the sensor hub. After receiving the start command, the sensor hub may instruct the display subsystem DSS in the sensor hub side to be powered on, instruct the DSS to obtain to-be-displayed content of the prompt information according to the display rule indicated by the AP, and refresh a display panel (for example, an LCD display panel or an OLED display panel) on the screen with the to-be-displayed content. That is, the DSS sends the to-be-displayed content for display. After sending the to-be-displayed content for display, the DSS may be powered off, and enters a low-power consumption state, to reduce power consumption of the electronic device. The DSS is powered on again only when the DSS needs to refresh displayed content next time. To-be-displayed content in a shared memory is a machine language. For example, the fingerprint identifier may be a fingerprint icon, but to-be-displayed content of the fingerprint icon is some character strings used to describe the fingerprint icon.

It should be noted that, in a current screen-off state, the DSS does not need to refresh the displayed content again,

TABLE 1

| Command | Name | Parameter 1 | Value of the parameter 1 | Parameter 2 | Value of the parameter 2 |
| --- | --- | --- | --- | --- | --- |
| Configure a display area | First prompt information | Value | Value 1 | Start coordinates | Start coordinates 1 |
| | Second prompt information | Value | Value 2 | Start coordinates | Start coordinates 2 |
| | . . . | . . . | . . . | . . . | . . . | and therefore may not be powered on again in the current screen-off state. In this way, power of the electronic device can be saved.

When the sensor hub determines, in the foregoing possible implementations, that the prompt information needs to be displayed (for example, when a touch event is detected), the sensor hub sends a display instruction to the display panel, and the display panel draws a graphical user interface (GUI) based on the to-be-displayed content of the prompt information sent by the DSS for display, to display the prompt information on the screen. The electronic device enters an always on display state.

Figure 13A:
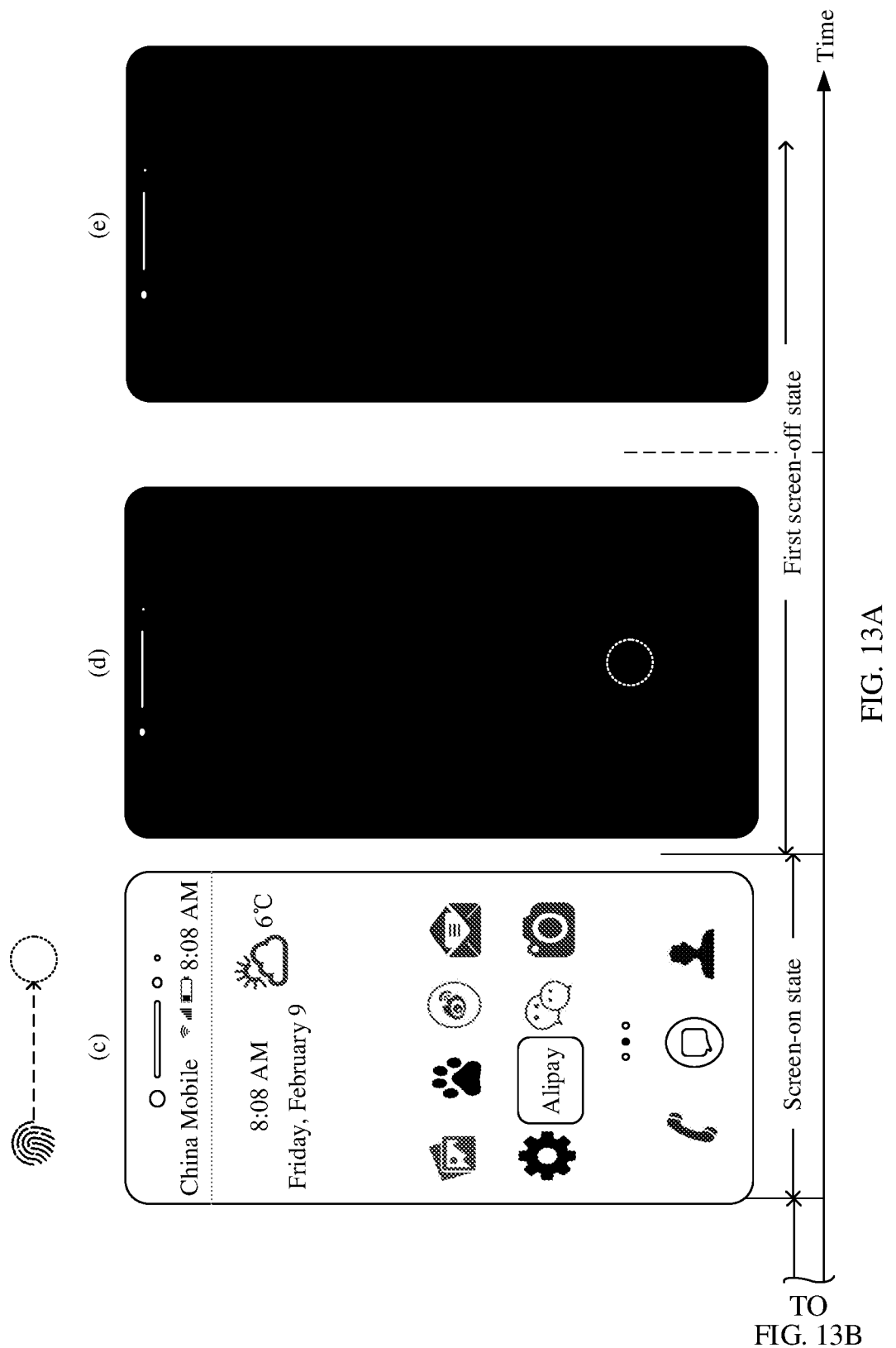

It should be noted that, in this embodiment of this application, the electronic device includes the shared memory (the shared memory is different from a display memory on the AP side) that can be directly accessed by both the AP and the sensor hub. The shared memory may be preset or may be dynamically applied for, and the DSS points to the shared memory during initialization. The AP side writes the to-be-displayed content into the shared memory, and the DSS obtains the to-be-displayed content from the shared memory, to refresh the display panel with the to-be-displayed content. For example, referring to FIG. 13A and FIG. 13B, when the user instructs to change the fingerprint identifier from a fingerprint icon to a circle, the AP may write updated content into the shared memory. In a next screen-off state, after the sensor hub enables the always on display function, the DSS may obtain the updated circle from the shared memory and send the updated circle for display, and the display panel displays the updated circle when the fingerprint identifier needs to be displayed. That is, the AP updates content in the shared memory only when the to-be-displayed content needs to be changed. However, when the to-be-displayed content does not need to be changed, the AP side does not frequently update the content in the shared memory. When the prompt information is the fingerprint identifier, the to-be-displayed content does not need to be updated in the current screen-off state, and the AP may enter the sleep state, to reduce power consumption of the electronic device.

When the sensor hub determines, in the foregoing possible implementations, to stop displaying the prompt information (for example, when display duration for which the prompt information is displayed exceeds preset duration), the sensor hub sends a display stop instruction to the display panel. The display panel may be turned off, and the electronic device stops always on display.

Figure 14:
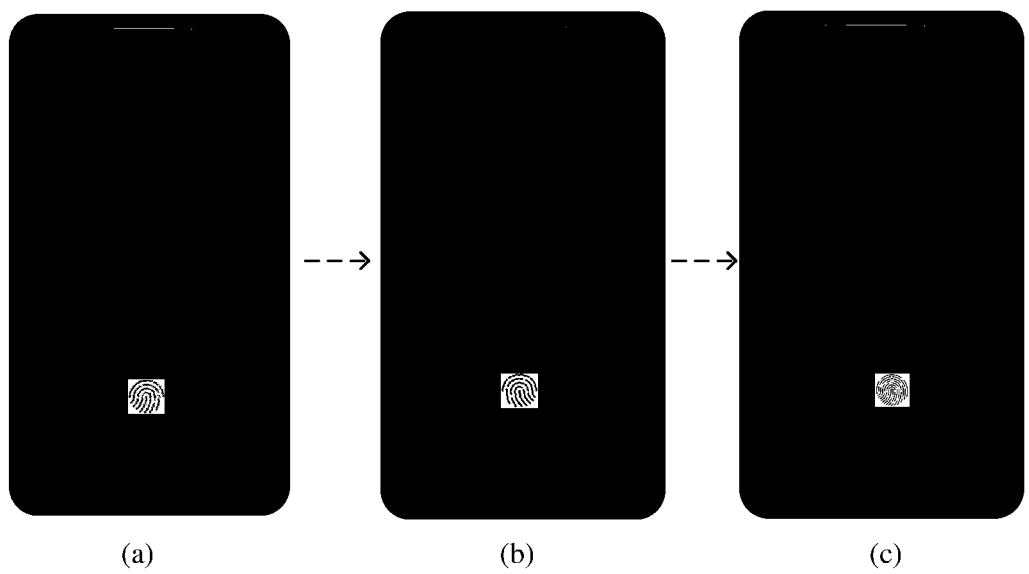
FIG. 14 is another schematic diagram of always on display according to an embodiment of this application.

Optionally, in a possible implementation, a plurality of fingerprint identifiers may be stored in the shared memory. The fingerprint identifiers may be located in a same area, but pixels corresponding to different fingerprint identifiers are not completely the same. In the screen-off state, each time the sensor hub displays a fingerprint identifier, the display panel may display one fingerprint identifier in the shared memory in turn or randomly. In this way, pixels lightened each time the fingerprint identifier is displayed may not be completely the same, so that a probability of screen burning can be reduced, and better visual experience can be provided for the user. For example, three fingerprint identifiers are stored in the shared memory. Referring to FIG. 14, each time the electronic device needs to display a fingerprint identifier, the electronic device displays each fingerprint identifier in the shared memory in turn.

After the electronic device detects a screen-on event, the AP is woken up, and sends another instruction command, namely, a stop command, to the sensor hub, to instruct the sensor hub to disable the always on display function. After receiving the stop command sent by the AP, the sensor hub disables the always on display function to disable always on display, and the electronic device turns on the screen and exits a low-power consumption mode. After receiving the start command sent by the AP again, the sensor hub enables the always on display function again. There may be many cases in which the electronic device detects a screen-on event. For example, the electronic device detects, in the screen-off state, that a power button is triggered, or detects a preset gesture (for example, double-tap on the screen) in the screen-off state, or receives an incoming call, or receives an SMS message. Examples are not listed one by one herein.

In a specific implementation, after the electronic device is powered on, or after the user turns on the always on display switch on the electronic device, or after the user records a fingerprint again, a start command sent by the AP after a screen-off event is detected may be referred to as a start command. When fingerprint unlocking is enabled and an in-screen fingerprint is recorded, a start (start) command sent by the AP after a screen-off event is detected may also be referred to as a restore (restore) command. When the electronic device has successfully entered the always on display state according to the start command, and receives a screen-on instruction, a stop (stop) command sent by the electronic device may also be referred to as a pause (pause) command.

Figure 15:
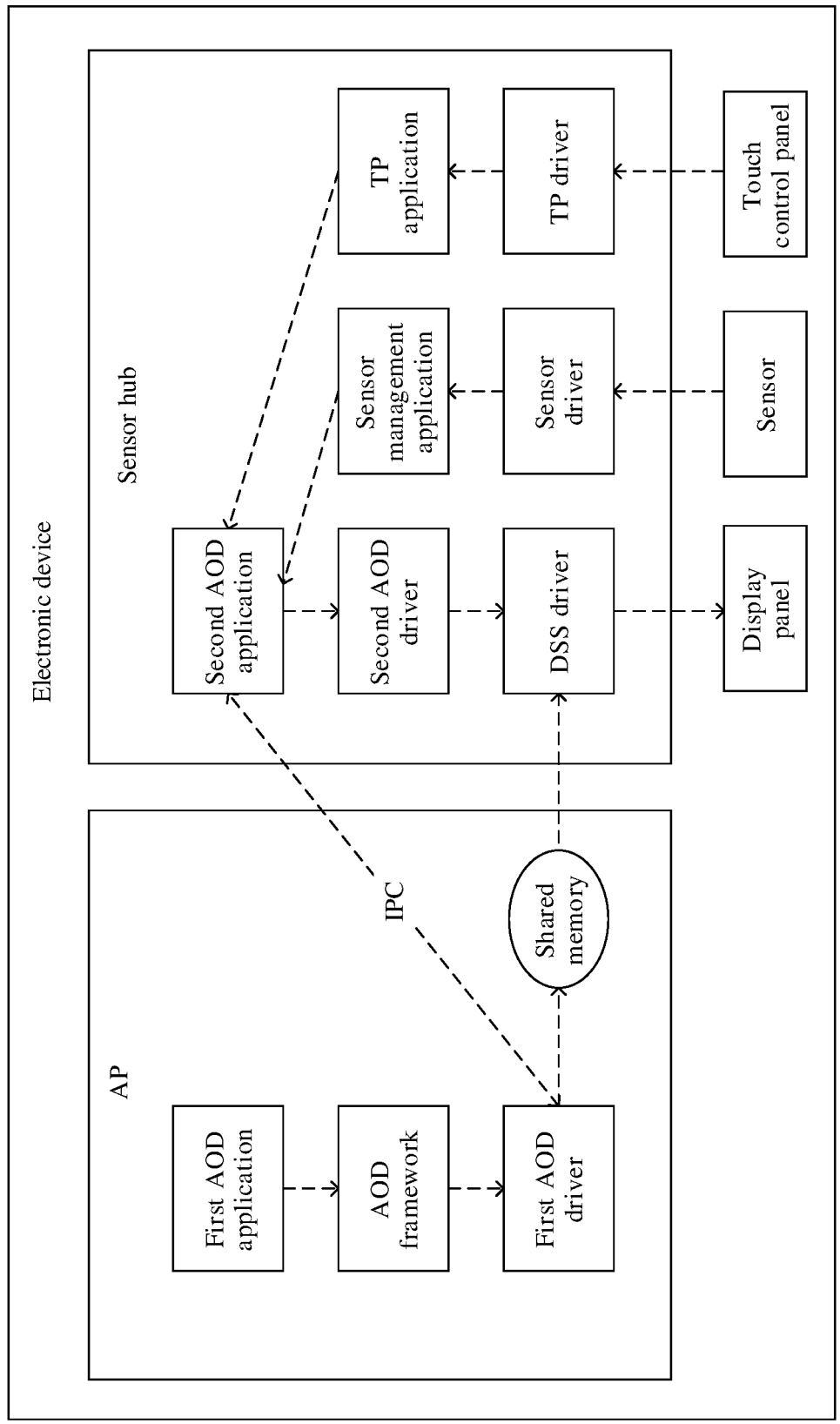
FIG. 15 is a schematic structural diagram of modules of an electronic device according to an embodiment of this application.

In a possible design, as shown in FIG. 15, the AP side of the electronic device may include modules such as a first AOD application, an AOD framework (framework), a first AOD driver, and the shared memory. The sensor hub side of the electronic device may include modules such as a second AOD application, a second AOD driver, a DSS driver, a sensor management application, a sensor driver, a TP application, and a TP driver. In addition, the electronic device may further include hardware such as the display panel, at least one sensor, a touch panel, and a fingerprint recognition component. The display panel and the touch panel TP may be combined into a touchscreen in this embodiment of this application. In addition, the electronic device may further include a fingerprint verification module, which may be configured to cooperate with the fingerprint recognition component to verify whether a fingerprint is valid.

Based on the electronic device in the structure shown in FIG. 15, the transmission channel AP-IPC-sensor hub may be specifically first AOD application-AOD framework-first AOD driver-IPC-second AOD application-second AOD. The instruction command in this embodiment of this application may be transmitted by using the specific transmission channel. Information may be transmitted between the first AOD application and the first AOD driver by using a device node.

The second AOD application, the second AOD driver, the DSS driver, and the display panel may be configured to: display a fingerprint identifier if necessary, and stop displaying the fingerprint identifier if not necessary. The sensor management module, the sensor management driver, and the at least one sensor may be configured to: obtain sensor detection data, and report a sensor event to the second AOD application, so that the second AOD application determines whether to display or stop displaying the fingerprint identifier. The TP application, the TP driver, the touch panel, and the like may be configured to: detect an interrupt event such as a floating event or a touch event, and report the interrupt event to the second AOD application, so that the second AOD application determines whether to display or stop displaying the fingerprint identifier.

In addition, in another possible design, a fingerprint identifier may be provided on a screen protector of the electronic device, and is used to prompt the user of a position of the fingerprint recognition area. For example, the fingerprint identifier may be an area with a plurality of small protrusions (a dull polish-like effect is provided for the user when the user touches the fingerprint identifier), a layer of silkscreen with a visual prompt, an area with a visual protrusion or a visual depression, an area with a protrusion or a depression, or the like.

Further, the prompt information in this embodiment of this application may further include other information, for example, one or more of time information, date information, power information, an SMS message prompt, or a missed call prompt. In the foregoing embodiment of this application, an example in which the prompt information is the fingerprint identifier is used to describe a manner of displaying or stopping displaying the prompt information in the screen-off state. The manner of dynamically displaying the fingerprint identifier in the screen-off state may also be applied to other information such as the time information and the date information in the prompt information. Details are not described herein.

Figure 16:
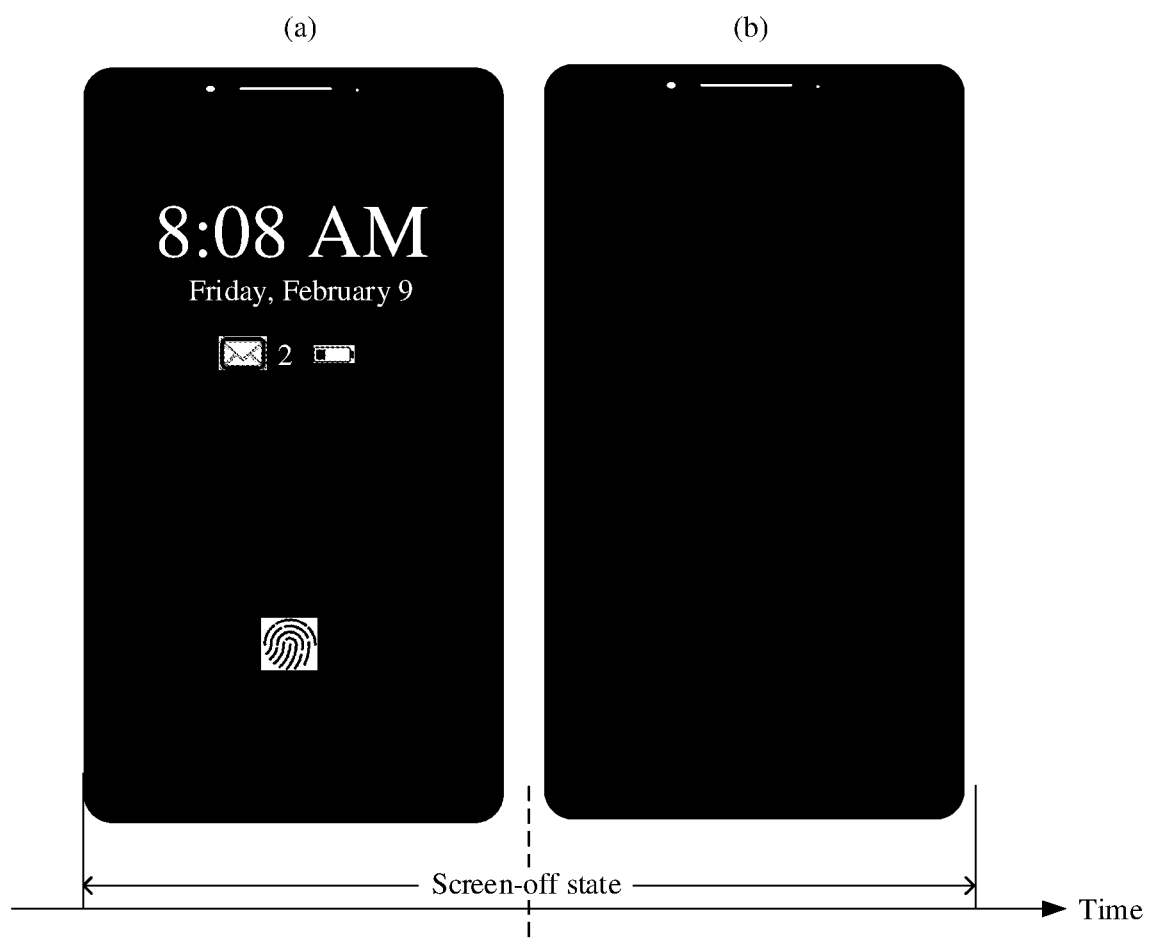
FIG. 16 is another schematic diagram of always on display according to an embodiment of this application.

It should be noted that, referring to FIG. 16, in the screen-off state, like the fingerprint identifier, the prompt information such as the time information may be displayed only if necessary, or otherwise is not displayed, to reduce power consumption of the electronic device. In another possible implementation, referring to FIG. 17, in the screen-off state, the fingerprint identifier may be displayed if necessary, and the prompt information such as the time information may be always displayed. In another possible implementation, in the screen-off state, the sensor hub may always display the prompt information such as the time information, and the electronic device may be always in the always on display state. This is not specifically limited in this embodiment of this application.

When the prompt information further includes other information, the instruction command may further include a start update command, an end update command, and the like. When the prompt information further includes the time information and the date information, the instruction command may further include a command for setting time and time zone formats.

When the AP sends the start command for the first time, in addition to the display rule command, the AP may further send the command for setting time and time zone formats, to send time and time zone formats to the sensor hub, so that the sensor hub displays a time and a date according to the time and time zone formats in the screen-off state.

In addition, it should be further noted that, when the prompt information includes only the fingerprint identifier, in the screen-off state, the AP enters the sleep state to reduce power consumption. When the prompt information further includes the other information, in the screen-off state, the AP may be woken up when the other information needs to be updated, and send the start update command and the end update command to the sensor hub, to instruct the sensor hub to update the displayed other information. To be specific, when the prompt information further includes the other information, in a period from screen-off to screen-on, when the other information needs to be updated, the AP is woken up, sends the start update command to the sensor hub, and writes to-be-displayed content of updated other information into the shared memory. After writing the to-be-displayed content, the AP sends the end update command to the sensor hub, and the sensor hub instructs the DSS to be powered on. After being powered on, the DSS obtains the to-be-displayed content of the updated other information, and transmits the to-be-displayed content of the updated other information to the display panel. Then, the DSS may be powered off to reduce power consumption. The display panel displays the updated other information. Specifically, the screen may display the updated other information immediately after the DSS sends the updated other information for display, or may display the updated other information when the electronic device needs to display the prompt information. This is not limited in this embodiment of this application.

For example, the sensor hub possibly cannot maintain the date information accurately. Therefore, in the screen-off state, when a date needs to be updated, after being woken up, the AP may send a start update command to the sensor hub, and write updated date content into the shared memory. The AP may send an end update command to the sensor hub after writing the updated date content. After receiving the end update command, the sensor hub may instruct the DSS to obtain the updated date content from the shared memory and send the updated date content for display. The display panel displays the updated date when date content needs to be displayed. For another example, in the screen-off state, when the electronic device receives an SMS message, the AP is woken up, and sends a start update command and an end update command to the sensor hub, to instruct the sensor hub to update information about the SMS message (for example, update a quantity of unread SMS messages from 1 to 2, or display an SMS message icon if the SMS message icon is not displayed previously).

In addition, when the prompt information further includes other information, each type of information stored in the shared memory is stored in a fixed area (for example, the fingerprint identifier, the SMS message icon, and an SMS message quantity may be separately stored in different areas). The AP side performs update only when a specific type of information changes, and the AP side does not perform update when each type of information does not change. Therefore, frequent update performed by the AP can be avoided, and power consumption of the electronic device can be reduced. Particularly, in this embodiment of this application, in the screen-off state, the sensor hub may not need the AP to participate in maintenance and time display. However, in the prior art, in the screen-off state, the AP needs to be woken up every minute to refresh a current time. Therefore, the AP is usually in the wake-up state in the screen-off state, and consequently power consumption of the electronic device is increased.

It should be further noted that, in the screen-off state, even if the fingerprint identifier may be displayed if necessary, the prompt information such as the time information may be always displayed, or even if the sensor hub always displays the prompt information such as the time information, the AP needs to be woken up only in some cases (for example, when a date needs to be updated) in a display process, and in most cases, the AP does not need to participate, but only the low-speed and low-power consumption sensor hub may be required. Therefore, power consumption of the electronic device can still be reduced.

Figure 18:
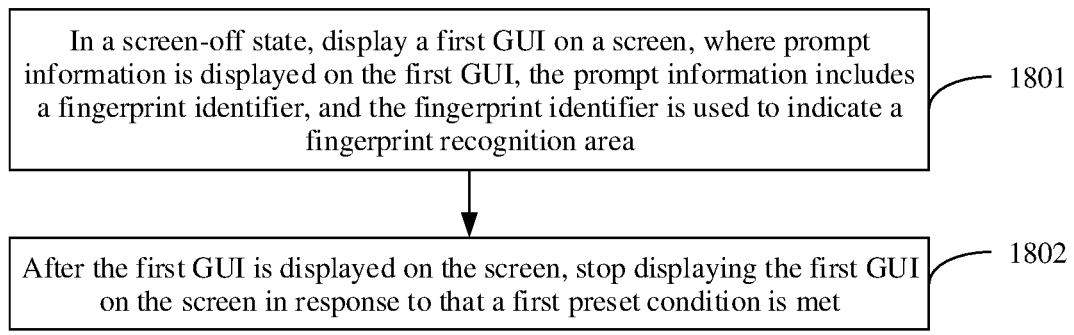
FIG. 18 is a flowchart of a GUI display method according to an embodiment of this application.

Another embodiment of this application provides a graphical user interface (GUI) display method. The method is implemented on an electronic device having a touchscreen. Referring to FIG. 18, the method may include the following steps:

1801. The electronic device displays a first GUI on the screen when the electronic device is in a screen-off state, where prompt information is displayed on the first GUI, the prompt information includes a fingerprint identifier, and the fingerprint identifier is used to indicate a fingerprint recognition area.

1802. After the electronic device displays the first GUI on the screen, the electronic device stops displaying the first GUI on the screen in response to that a first preset condition is met.

Figure 17:
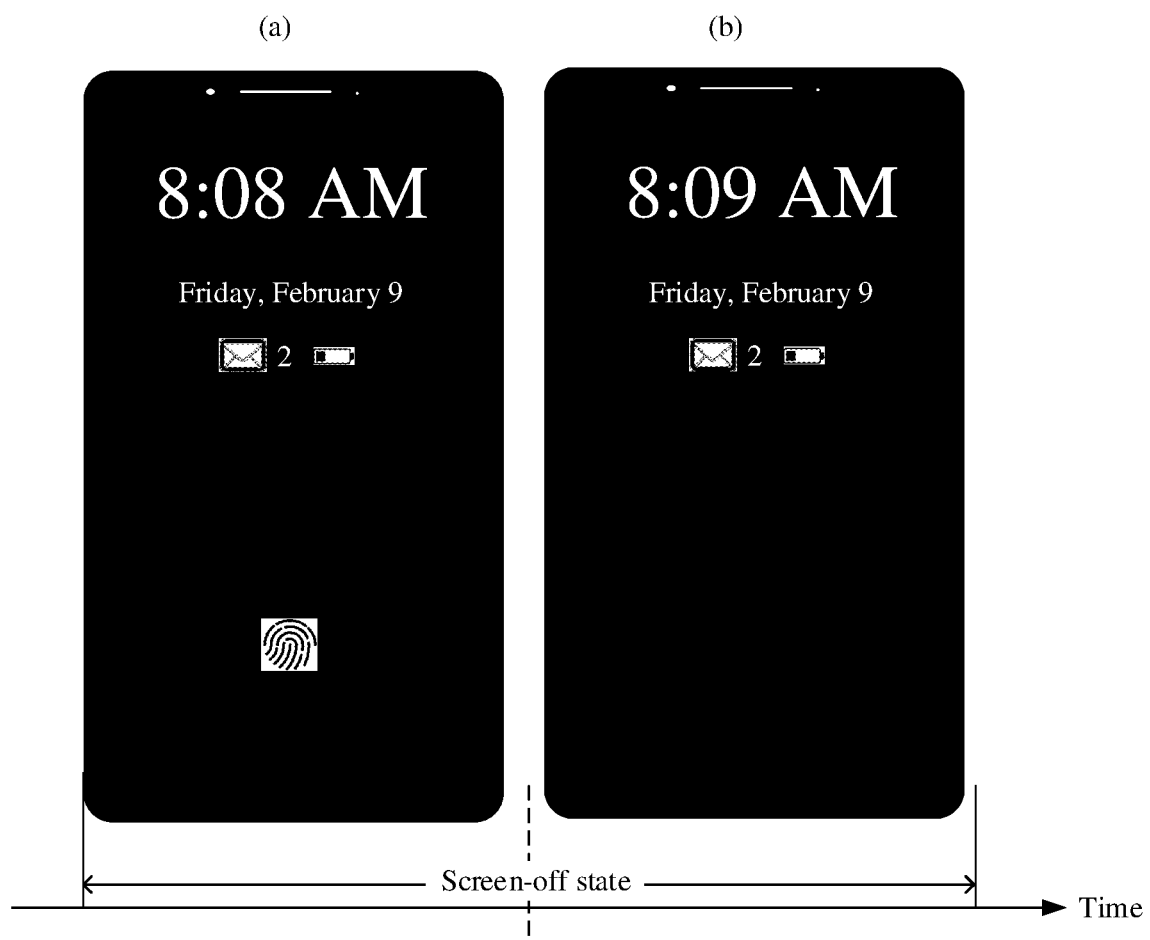
FIG. 17 is another schematic diagram of always on display according to an embodiment of this application.

For example, the first GUI may be an interface on which the prompt information is displayed in FIG. 1, FIG. 4 (*a*) to FIG. 4(*f*), FIG. 14, FIG. 16, or FIG. 17.

In this way, the electronic device may intermittently and dynamically display the GUI including the prompt information such as the fingerprint identifier on the screen, instead of always displaying a fingerprint icon in a screen-off state like in the prior art. Therefore, power consumption of the electronic device can be reduced.

Further, after step 1802, the method may further include the following step:

1803. The electronic device displays a second GUI on the screen in response to that a second preset condition is met, where the prompt information is displayed on the second GUI.

Specifically, the electronic device may include a first processor and a second processor. When the electronic device is in a screen-on state or a screen-obscurity state, in response to that the first processor detects a screen-off event, the electronic device may enter the screen-off state, and the second processor replaces the first processor to determine whether to display the prompt information. When the electronic device is in the screen-off state, the second processor instructs the screen to display the first GUI. After the prompt information is displayed, when the first preset condition is met, the second processor may instruct the screen to stop displaying the first GUI. The first processor is an application processor AP, and the second processor is a coprocessor such as a sensor hub.

The protocol processor sensor hub is a coprocessor having a lower speed and low power consumption than the AP. Therefore, compared with the prior art in which in the screen-off state, the AP is in a wake-up state to control a fingerprint icon to be always displayed, in this embodiment of this application, the low-power consumption coprocessor sensor hub replaces the AP to manage and control display of prompt information such as a fingerprint identifier on a GUI, so that power consumption of the electronic device can be reduced.

For specific content of the first preset condition and the second preset condition and a specific process in which the sensor hub replaces the AP to determine whether to display the prompt information, refer to related descriptions in the foregoing embodiment. Details are not described herein again.

It should be noted that steps 18*oi* to 1803 are all steps performed when the electronic device is in the screen-off state.

It may be understood that, to implement the foregoing functions, the electronic device includes a corresponding hardware structure and/or software module for performing each function. A person of ordinary skill in the art should easily be aware that, in combination with the examples described in the embodiments disclosed in this specification, algorithm steps may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, function modules in the electronic device may be defined according to the foregoing method examples. For example, each function module may be defined in a correspondence to each function, or two or more functions may be integrated in one processing module. The integrated module may be implemented in a form of hardware, or may be implemented in a form of a software function module. It should be noted that, in this embodiment of this application, module division is an example, and is merely a logical function division. In actual implementation, another division manner may be used.

Figure 19:
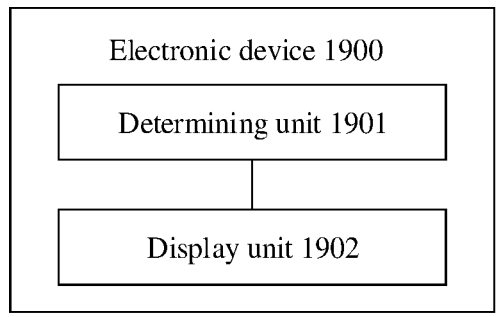
FIG. 19 is a schematic structural diagram of an electronic device according to an embodiment of this application.

When each function module is obtained through division based on each corresponding function, FIG. 19 is a possible schematic diagram of composition of the electronic device in the foregoing embodiment. As shown in FIG. 19, the electronic device 1900 may include a determining unit 1901 and a display unit 1902. The determining unit 1901 may be configured to support the electronic device 1900 in determining whether a first preset condition or a second preset condition is met, and/or used in another process of the technology described in this specification. The display unit 1902 may be configured to support the electronic device 1900 in displaying or stopping displaying prompt information, and/or used in another process of the technology described in this specification.

It should be noted that all related content of the steps in the foregoing method embodiment can be cited in function description of the corresponding function modules. Details are not described herein again.

The electronic device provided in this embodiment of this application is configured to perform the foregoing prompt information display method and the foregoing GUI display method, and therefore can achieve same effects as the foregoing prompt information display method and the foregoing GUI display method.

When an integrated unit is used, the determining unit 1901 may be integrated into a processing module, and the display unit 1902 may be integrated into a display module.

The processing module is configured to control and manage an action of the electronic device. For example, the processing module is configured to support the electronic device in determining whether a first preset condition or a second preset condition is met, and/or is used in another process of the technology described in this specification. The display module may be configured to support the electronic device in performing steps 301 and 302 in FIG. 3, and may further display a GUI, an image, data, or the like to a user. A storage module is configured to store program code and data of the electronic device. A communications module is configured to support the electronic device in communicating with another network entity.

The processing module may be a processor or a controller, for example, a central processing unit (central processing unit, CPU), a graphics processing unit (graphics processing unit, GPU), a general purpose processor, a digital signal processor (digital signal processor, DSP), an application-specific integrated circuit (application-specific integrated circuit, ASIC), a field programmable gate array (field programmable gate array, FPGA) or another programmable logic device, a transistor logic device, a hardware component, or a combination thereof. The processor may implement or execute various example logical blocks, modules, and circuits described with reference to content disclosed in this application. Alternatively, the processor may be a combination of processors implementing a computing function, for example, a combination of one or more microprocessors, or a combination of the DSP and a microprocessor.

The display module may be a display, and may be a device configured to display information entered by the user, information provided for the user, and various menus of the terminal. Specifically, the display may be configured in a form of a liquid crystal display, an organic light emitting diode, or the like. In addition, a touchpad may be further integrated into the display, and is configured to: collect a touch event on or near the touchpad, and send collected touch information to another component (for example, the processor).

In addition, the electronic device may further include a storage module and a communications module. The storage module may be a memory. The memory may include a high-speed random access memory RAM, or may include a nonvolatile memory such as a disk storage device and a flash memory device, or another volatile solid-state storage device. The communications module may be a device that interacts with another terminal or server, such as a radio frequency circuit, a Bluetooth chip, or a Wi-Fi chip.

In a specific implementation, when the processing module is a processor, the display module is a display, and the storage module is a memory, the electronic device in this embodiment of this application may be specifically the mobile phone shown in FIG. 2.

An embodiment of this application further provides a computer storage medium. The computer storage medium stores a computer instruction, and when the computer instruction is run on an electronic device, the electronic device performs the related method steps, to implement the prompt information display method in the foregoing embodiments.

An embodiment of this application further provides a computer program product.

When the computer program product is run on a computer, the computer is enabled to perform the related method steps to implement the prompt information display method in the foregoing embodiments.

In addition, an embodiment of this application further provides an apparatus. The apparatus may be specifically a chip, a component, or a module. The apparatus may include a processor and a memory that are connected. The memory is configured to store a computer executable instruction, and when the apparatus runs, the processor may execute the computer executable instruction stored in the memory, so that the chip performs the prompt information display method in the foregoing method embodiments.

The electronic device, the computer storage medium, the computer program product, or the chip provided in the embodiments of this application is configured to perform the corresponding method provided above. Therefore, for beneficial effects that can be achieved, refer to the beneficial effects of the corresponding method provided above. Details are not described herein again.

The foregoing descriptions about implementations allow a person skilled in the art to understand that, for the purpose of convenient and brief description, division of the foregoing function modules is taken as an example for illustration. In actual application, the foregoing functions can be allocated to different modules and implemented according to a requirement, that is, an inner structure of an apparatus is divided into different function modules to implement all or some of the functions described above.

In the several embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor (processor) to perform all or some of the steps of the methods described in the embodiments of this application. The foregoing storage medium includes: any medium that can store program code, such as a USB flash drive, a removable hard disk, a read-only memory (read-only memory, ROM), a random access memory (random access memory, RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

That is claimed is:

1. A prompt information display method, comprising:
   displaying, by an electronic device having a screen that is a touchscreen, prompt information on the screen when the electronic device is in a screen-off state, wherein the prompt information comprises a fingerprint identifier, and the fingerprint identifier indicates a fingerprint recognition area;
   stopping, by the electronic device, after the electronic device displays the prompt information on the screen, the displaying the prompt information on the screen in response to a first preset condition being met, wherein the first preset condition is associated with a duration of which the prompt information is displayed; and
   displaying, by the electronic device, after the electronic device stops displaying the prompt information on the screen, the prompt information on the screen in response to a second preset condition being met;

wherein the electronic device comprises a first processor and a second processor, and wherein the electronic device enters the screen-off state in response to the first processor detecting a screen-off event while the electronic device is in a screen-on state or a screen-obscurity state;

wherein the first processor enters a sleep state in response to the electronic device being in a screen-off state;

wherein the displaying the prompt information on the screen when the electronic device is in the screen-off state comprises instructing, by the second processor, the screen to display the prompt information when the electronic device is in the screen-off state; and wherein the stopping the displaying the prompt information on the screen comprises instructing, by the second processor, the screen to stop displaying the prompt information.

2. The method according to claim 1, wherein the stopping the displaying the prompt information on the screen comprises performing at least one of:

stopping, by the electronic device, the displaying the prompt information on the screen in response to detecting that the duration for which the prompt information is displayed is greater than or equal to preset duration.

3. The method according to claim 2, wherein the displaying the prompt information on the screen in response to the second preset condition being met comprises:

displaying, by the electronic device, the prompt information on the screen in response to at least one of the electronic device being lifted, detecting that the screen is touched, detecting a floating event in the fingerprint recognition area or a preset area, detecting that a front side of the electronic device faces upward while the electronic device is in a handheld motion state, or detecting, while the electronic device is in the handheld motion state, that a predetermined side of the electronic device faces upward and a pressure value in the fingerprint recognition area or a preset area is greater than or equal to a preset value.

4. The method according to claim 1, wherein the second processor is configured to manage at least one sensor or the screen; and wherein the instructing, by the second processor, the screen to display the prompt information comprises instructing, by the second processor, based on detection data of the at least one sensor or an interrupt event of the screen, the screen to display the prompt information; and wherein the instructing, by the second processor, the screen to stop displaying the prompt information instructing, by the second processor, based on detection data of the at least one sensor or the interrupt event of the screen, the screen to stop displaying the prompt information.

5. The method according to claim 1, wherein further comprising performing, after the first processor detects the screen-off event:

sending, by the first processor, an instruction command to the second processor, wherein the instruction command comprises a start command, and wherein the start command instructs the second processor to enable an always on display function;

entering, by the first processor, the sleep state;

triggering, by the second processor, after receiving the start command, a display subsystem (DSS) to be powered on;

obtaining, by the DSS, to-be-displayed content of the prompt information according to a display rule;

transmitting, by the DSS, the to-be-displayed content to the screen; and entering, by the DSS, a power-off state; and wherein the instructing, by the second processor, the screen to display the prompt information comprises instructing, by the second processor, the screen to display the prompt information based on the to-be-displayed content.

6. The method according to claim 5, wherein the electronic device comprises a shared memory, and wherein the shared memory is configured to store the to-be-displayed content of the prompt information; and wherein, when the start command is sent by the first processor for a first time, the instruction command further comprises a display rule command, and wherein the display rule command indicates a display rule; and wherein the obtaining, by the DSS, the to-be-displayed content according to the display rule comprises obtaining, by the DSS, the to-be-displayed content from the shared memory according to the display rule indicated by the display rule command.

7. The method according to claim 6, wherein the display rule command comprises a display area setting command, and wherein the display area setting command indicates a position of a to-be-displayed area;

wherein the shared memory stores to-be-displayed content of a plurality of fingerprint identifiers; and wherein the instructing, by the second processor, the screen to display the prompt information comprises:

sending, by the second processor, a display instruction to the screen; and displaying, by the screen, one of the plurality of fingerprint identifiers after receiving the display instruction.

8. The method according to claim 6, wherein the prompt information further comprises time information and date information, wherein, when the start command is the start command sent by the first processor for the first time, the instruction command further comprises a command for setting time and time zone formats, and wherein the command for setting the time and time zone formats indicates the time and time zone formats.

9. The method according to claim 6, wherein the prompt information further comprises other information, and wherein the other information comprises at least one of time information, date information, power information, a short message service (SMS) message prompt, or a missed call prompt; and wherein the method further comprises performing, after the entering, by the first processor, the sleep state:

entering, by the first processor, a wake-up state when the other information needs to be updated;

sending, by the first processor, a start update command to the second processor;

writing, by the first processor, to-be-displayed content of updated other information into the shared memory;

sending, by the first processor, an end update command to the second processor;

instructing, by the second processor, the DSS to be powered on;

obtaining, by the DSS, the to-be-displayed content of the updated other information;

transmitting, by the DSS, the to-be-displayed content of the updated other information to the screen;

entering, by the DSS, the power-off state; and
displaying, by the screen, the updated other information.

10. The method according to claim 5, further comprising performing, after the entering, by the first processor, the sleep state:
sending, by the first processor, in response to the first processor being woken up by a screen-on event, another instruction command to the second processor, wherein the another instruction command is a stop command, and wherein the stop command instructs the second processor to disable the always on display function.

11. The method according to claim 1, wherein the prompt information further comprises at least one of time information, date information, power information, short message service (SMS)message prompt, or a missed call prompt.

12. The method according to claim 1, wherein the first processor is an application processor, and wherein the second processor is a coprocessor.

13. An electronic device, comprising:
a screen that is a touch screen;
one or more processors; and
one or more memories, wherein the one or more memories are coupled to the one or more processors and store computer program code for execution by the one or more processors, the computer program code comprising instructions for:
displaying prompt information on the screen when the electronic device is in a screen-off state, wherein the prompt information comprises a fingerprint identifier, and wherein the fingerprint identifier indicates a fingerprint recognition area;
stopping, after the electronic device displays the prompt information on the screen, displaying the prompt information on the screen in response to a first preset condition being met, wherein the first preset condition is associated with a duration of which the prompt information is displayed; and
displaying, after the electronic device stops displaying the prompt information on the screen, the prompt information on the screen in response to a second preset condition being met;
wherein the one or more processors comprise a first processor and a second processor, and wherein the program further includes instructions for causing the electronic device to enter the screen-off state when the electronic device is in a screen-on state or a screen-obscurity state, and in response to the first processor detects a screen-off event, the electronic device enters the screen-off state;
wherein the first processor enters a sleep state in response to the electronic device being in a screen-off state;
wherein the instructions for displaying the prompt information on the screen when the electronic device is in a screen-off state include instructions for instructing, by the second processor, the screen to display the prompt information when the electronic device is in the screen-off state; and
wherein the instructions for stopping displaying the prompt information on the screen include instructions for instructing, by the second processor, the screen to stop displaying the prompt information.

14. The electronic device according to claim 13, wherein the instructions for stopping displaying the prompt information on the screen include instructions for performing at least one of:
stopping displaying the prompt information on the screen in response to detecting that the duration during which the prompt information is displayed is greater than or equal to preset duration.

15. The electronic device according to claim 13, wherein the instructions for displaying the prompt information on the screen in response to the second preset condition being met include instructions for :
displaying the prompt information on the screen in response to at least one of the electronic device being lifted, detecting that the screen is touched, detecting a floating event in the fingerprint recognition area or a preset area, detecting that a front side of the electronic device faces upward while the electronic device is in a handheld motion state, or detecting, while the electronic device is in the handheld motion state, that a predetermined side of the electronic device faces upward and a pressure value in the fingerprint recognition area or a preset area is greater than or equal to a preset value.

16. The electronic device according to claim 13, wherein the second processor is configured to manage at least one sensor or the screen, and wherein the instructions for instructing the screen to display the prompt information include instructions for instructing, by the second processor based on detection data of the at least one sensor or an interrupt event of the screen, the screen to display the prompt information; and
wherein the instructions for instructing the screen to display the prompt information or stop displaying the prompt information include instructions for instructing, by the second processor based on detection data of the at least one sensor or an interrupt event of the screen, the screen to stop displaying the prompt information.

17. The electronic device according to claim 4, wherein the program further includes instructions for performing, after the first processor detects the screen-off event:
sending, by the first processor, an instruction command to the second processor, wherein the instruction command comprises a start command, and wherein the start command instructs the second processor to enable an always on display function;
entering, by the first processor, the sleep state;
triggering, by the second processor, after receiving the start command, a display subsystem (DSS) to be powered on;
obtaining, by the DSS, to-be-displayed content of the prompt information according to a display rule;
transmitting, by the DSS, the to-be-displayed content to the screen; and
entering, by the DSS, a power-off state; and
wherein the instructions for instructing, by the second processor, the screen to display the prompt information specifically include instructions for instructing, by the second processor, the screen to display the prompt information based on the to-be-displayed content.

18. A graphical user interface (GUI) display method, comprising:
displaying, by an electronic device having a screen that is a touchscreen, a first GUI on the screen when the electronic device is in a screen-off state, wherein prompt information is displayed on the first GUI, wherein the prompt information comprises a fingerprint identifier, and wherein the fingerprint identifier indicates a fingerprint recognition area;
stopping, by the electronic device, after the electronic device displays the first GUI on the screen, displaying the first GUI on the screen in response to a first preset condition being met, wherein the first preset condition is associated with a duration of which the prompt information is displayed; and displaying, by the electronic device, after the electronic device stops displaying the prompt information on the screen, a second GUI on the screen in response to a second preset condition being met, wherein the prompt information is displayed on the second GUI;

wherein the electronic device further has a first processor and a second processor, and wherein the electronic device enters the screen-off state in response to the first processor detecting a screen-off event while the electronic device is in a screen-on state or a screen-obscurity state;

wherein the first processor enters a sleep state in response to the electronic device being in a screen-off state;

wherein the displaying the second GUI in response t0 the second preset condition being met comprises instructing, by the second processor, the screen to display the second GUI on the screen in response t0 the second preset condition being met; and wherein the stopping the displaying the first GUI on the screen comprises instructing, by the second processor, the screen to stop displaying the first GUI.

* * * * *